US009790739B2

(12) United States Patent
Colson et al.

(10) Patent No.: US 9,790,739 B2
(45) Date of Patent: Oct. 17, 2017

(54) ARCHITECTURAL OPENING COVERINGS POWERED BY ROTARY MOTORS

(75) Inventors: Wendell Colson, Weston, MA (US);
Daniel Fogarty, Framingham, MA (US)

(73) Assignee: HUNTER DOUGLAS INC., Upper Saddle River, NJ (US)

( * ) Notice: Subject to any disclaimer, the term of this patent is extended or adjusted under 35 U.S.C. 154(b) by 461 days.

(21) Appl. No.: 13/699,580

(22) PCT Filed: May 28, 2011

(86) PCT No.: PCT/US2011/038469
§ 371 (c)(1),
(2), (4) Date: Feb. 4, 2013

(87) PCT Pub. No.: WO2011/150412
PCT Pub. Date: Dec. 1, 2011

(65) Prior Publication Data
US 2013/0199735 A1   Aug. 8, 2013

Related U.S. Application Data

(60) Provisional application No. 61/349,610, filed on May 28, 2010.

(51) Int. Cl.
*A47G 5/02* (2006.01)
*A47H 1/00* (2006.01)
(Continued)

(52) U.S. Cl.
CPC .................. *E06B 9/72* (2013.01); *E06B 9/42* (2013.01); *E06B 9/50* (2013.01); *E06B 9/80* (2013.01); *E06B 2009/6881* (2013.01)

(58) Field of Classification Search
CPC ..... E06B 9/80; E06B 9/50; E06B 9/42; E06B 2009/6881; E06B 9/72
(Continued)

(56) References Cited

U.S. PATENT DOCUMENTS 2,878,865 A    3/1959  Manley
3,186,473 A    6/1965  Myers et al.
(Continued)

FOREIGN PATENT DOCUMENTS

AU    2010901077    3/2010
CN    1331945    1/2002
(Continued)

OTHER PUBLICATIONS

Patent Cooperation Treaty, "International Search Report," issued in connection with Application No. PCT/US2012/000429, mailed Dec. 17, 2012, 3 pages.
(Continued)

*Primary Examiner* — Katherine Mitchell
*Assistant Examiner* — Jeremy Ramsey
(74) *Attorney, Agent, or Firm* — Hanley, Flight & Zimmerman, LLC

(57) ABSTRACT

Example architectural opening coverings powered by rotary motors are described. An example architectural opening covering apparatus includes a rotatable member, a covering mounted to the rotatable member, a motor having a drive shaft which is capable of rotating the rotatable member in a first direction to raise the covering and in a second direction opposite the first direction to lower the covering, and a drive shaft coupling substantially preventing the motor from applying torque in the second direction.

26 Claims, 18 Drawing Sheets

(51) Int. Cl.
  *E06B 9/72*  (2006.01)
  *E06B 9/42*  (2006.01)
  *E06B 9/50*  (2006.01)
  *E06B 9/80*  (2006.01)
  *E06B 9/68*  (2006.01)

(58) Field of Classification Search
  USPC .................. 160/1, 2, 3, 7, 8, 300, 301, 302
  See application file for complete search history.

(56) References Cited

U.S. PATENT DOCUMENTS

| | | | |
|---|---|---|---|
| 3,732,914 A | | 5/1973 | Flageollet |
| 3,853,167 A | | 12/1974 | Wardlaw |
| 4,085,345 A | | 4/1978 | Bullat |
| 4,112,996 A | * | 9/1978 | Fohl .......................... 160/296 |
| 4,372,367 A | | 2/1983 | Baldanello et al. |
| 4,413,665 A | | 11/1983 | Corcoran |
| 4,417,185 A | | 11/1983 | Bullat |
| 4,472,910 A | | 9/1984 | Iha |
| 4,519,487 A | | 5/1985 | Florin |
| 4,519,554 A | * | 5/1985 | Dussoliet et al. .......... 242/390.9 |
| 4,560,046 A | | 12/1985 | Lorello et al. |
| 4,618,804 A | | 10/1986 | Iwasaki |
| 4,766,941 A | | 8/1988 | Sloop et al. |
| 4,794,715 A | * | 1/1989 | Cherwin .......................... 40/514 |
| 4,807,686 A | | 2/1989 | Schnebly et al. |
| 4,972,129 A | | 11/1990 | Kawai et al. |
| 4,979,603 A | | 12/1990 | Wheatland |
| 5,039,925 A | | 8/1991 | Schap |
| 5,105,871 A | | 4/1992 | Baud et al. |
| 5,547,009 A | | 8/1996 | Plumer |
| 5,671,387 A | | 9/1997 | Jacobs et al. |
| 5,709,349 A | | 1/1998 | Villette et al. |
| 5,794,381 A | | 8/1998 | Rizkovsky |
| 5,799,716 A | | 9/1998 | Yamaguchi et al. |
| 5,803,150 A | | 9/1998 | Boiteau |
| 5,839,555 A | | 11/1998 | Hsieh |
| 5,848,634 A | | 12/1998 | Will et al. |
| 5,975,185 A | | 11/1999 | Miller et al. |
| 6,104,156 A | | 8/2000 | Bruno |
| 6,111,376 A | | 8/2000 | Jean-Marc |
| 6,158,563 A | | 12/2000 | Welfonder et al. |
| 6,244,325 B1 | | 6/2001 | Miller et al. |
| 6,259,218 B1 | | 7/2001 | Kovach et al. |
| 6,341,638 B1 | | 1/2002 | Thompson et al. |
| 6,346,889 B1 | | 2/2002 | Moss |
| 6,381,903 B1 | | 5/2002 | Desrochers et al. |
| 6,497,267 B1 | * | 12/2002 | Azar et al. .................. 160/310 |
| 6,571,853 B1 | | 6/2003 | Ciuca et al. |
| 6,628,029 B2 | | 9/2003 | Astegno |
| 6,680,594 B2 | | 1/2004 | Collett et al. |
| 6,733,413 B2 | | 5/2004 | Lagarde et al. |
| 6,751,909 B2 | | 6/2004 | Ranaudo |
| 6,810,997 B2 | | 11/2004 | Schreiber et al. |
| 6,843,301 B2 | * | 1/2005 | Carrillo et al. .............. 160/310 |
| 6,843,303 B2 | | 1/2005 | Siak et al. |
| 6,979,962 B2 | | 12/2005 | Cavarec et al. |
| 7,089,991 B2 | | 8/2006 | Jorgensen et al. |
| 7,134,474 B2 | | 11/2006 | Lagarde et al. |
| 7,240,582 B1 | | 7/2007 | Manaras et al. |
| 7,261,139 B2 | | 8/2007 | Varley et al. |
| D553,079 S | | 10/2007 | Poulet et al. |
| 7,466,090 B2 | | 12/2008 | Meewis et al. |
| 7,481,133 B2 | | 1/2009 | Walravens et al. |
| 7,599,612 B2 | | 10/2009 | Moseley et al. |
| 7,726,379 B2 | | 6/2010 | Beau |
| 7,770,961 B2 | | 8/2010 | Oxley |
| 7,839,109 B2 | | 11/2010 | Carmen, Jr. et al. |
| 8,037,922 B2 | | 10/2011 | Hawkins et al. |
| 8,125,167 B1 | | 2/2012 | Mullet et al. |
| 8,339,086 B2 | | 12/2012 | Feldstein et al. |
| 8,368,328 B2 | | 2/2013 | Mullet et al. |
| 8,575,872 B2 | | 11/2013 | Mullet et al. |
| 8,662,139 B2 | | 3/2014 | Anthony et al. |
| 8,723,454 B2 | | 5/2014 | Skinner et al. |
| 8,910,695 B2 | | 12/2014 | Knight |
| 8,931,541 B2 | | 1/2015 | Chambers et al. |
| 8,947,027 B2 | | 2/2015 | Mullet et al. |
| 9,181,750 B2 | | 11/2015 | Ticoalu et al. |
| 2002/0011262 A1 | | 1/2002 | Dieckmann |
| 2002/0153854 A1 | | 10/2002 | Reed et al. |
| 2002/0190678 A1 | | 12/2002 | Huber et al. |
| 2004/0011477 A1 | | 1/2004 | Walker et al. |
| 2004/0169490 A1 | | 9/2004 | Heurtault |
| 2004/0169940 A1 | | 9/2004 | Yoshida |
| 2005/0035238 A1 | * | 2/2005 | Fun ........................... E06B 9/72 |
| | | | 242/381 |
| 2005/0051283 A1 | | 3/2005 | Chatellard et al. |
| 2005/0173080 A1 | | 8/2005 | Carmen, Jr. et al. |
| 2005/0253710 A1 | | 11/2005 | Eskildsen |
| 2006/0042763 A1 | | 3/2006 | Le Ru |
| 2006/0042765 A1 | | 3/2006 | Varley et al. |
| 2006/0086874 A1 | | 4/2006 | Habel et al. |
| 2008/0052034 A1 | | 2/2008 | David et al. |
| 2008/0283200 A1 | | 11/2008 | Hummel et al. |
| 2009/0005911 A1 | | 1/2009 | Decroix et al. |
| 2009/0256021 A1 | | 10/2009 | Dorrough |
| 2010/0006240 A1 | | 1/2010 | Cieslik |
| 2010/0018654 A1 | * | 1/2010 | Skinner et al. ............ 160/84.02 |
| 2010/0073262 A1 | | 3/2010 | Matsumoto |
| 2010/0191409 A1 | | 7/2010 | Weston |
| 2010/0200176 A1 | | 8/2010 | Magli |
| 2010/0236891 A1 | | 9/2010 | Lagarde et al. |
| 2010/0244602 A1 | | 9/2010 | Perret et al. |
| 2010/0279779 A1 | | 11/2010 | Anthoine |
| 2011/0048655 A1 | | 3/2011 | Andreasen et al. |
| 2011/0073262 A1 | | 3/2011 | Frede |
| 2011/0139380 A1 | | 6/2011 | Anthony et al. |
| 2011/0203748 A1 | | 8/2011 | Muller et al. |
| 2011/0203754 A1 | * | 8/2011 | Mullet .................... E06B 9/42 |
| | | | 160/405 |
| 2012/0200247 A1 | | 8/2012 | Baugh |
| 2013/0140130 A1 | | 6/2013 | Dang |
| 2014/0090787 A1 | | 4/2014 | Colson et al. |
| 2014/0133019 A1 | | 5/2014 | Mullet et al. |
| 2014/0224437 A1 | | 8/2014 | Colson et al. |
| 2014/0262058 A1 | | 9/2014 | Mullet et al. |
| 2014/0262078 A1 | | 9/2014 | Colson et al. |
| 2014/0290870 A1 | | 10/2014 | Colson et al. |
| 2015/0090409 A1 | | 4/2015 | Mullet et al. |

FOREIGN PATENT DOCUMENTS

| | | |
|---|---|---|
| CN | 2823518 | 10/2006 |
| CN | 1981311 | 6/2007 |
| CN | 201202392 | 3/2009 |
| CN | 201943550 | 8/2011 |
| CN | 102333469 | 1/2012 |
| DE | 29818023 | 12/1998 |
| DE | 202011051106 | 9/2011 |
| EP | 0783072 A1 | 7/1997 |
| EP | 0838574 | 4/1998 |
| EP | 0940553 A2 | 9/1999 |
| EP | 1659256 | 5/2006 |
| EP | 2192249 | 6/2010 |
| JP | 59230942 | 12/1984 |
| JP | 622797 | 1/1987 |
| JP | 253496 | 4/1990 |
| JP | 74774 | 1/1995 |
| JP | 08199950 | 8/1996 |
| JP | H1046961 | 2/1998 |
| JP | 200270465 | 3/2002 |
| JP | 2004190476 | 7/2004 |
| JP | 2004237362 | 8/2004 |
| JP | 20062531 | 1/2006 |
| JP | 2006233418 | 9/2006 |
| WO | WO0241740 | 5/2002 |

(56) References Cited

FOREIGN PATENT DOCUMENTS

| | | |
|---|---|---|
| WO | 2010011751 A1 | 1/2010 |
| WO | 2011113094 | 9/2011 |

OTHER PUBLICATIONS

Patent Cooperation Treaty, "Written Opinion of the International Searching Authority," issued in connection with Application No. PCT/US2012/000429, mailed Dec. 17, 2012, 5 pages.

Patent Cooperation Treaty, "International Search Report," issued in connection with Application No. PCT/US2012/000428, mailed Dec. 21, 2012, 3 pages.

Patent Cooperation Treaty, "Written Opinion of the International Searching Authority," issued in connection with Application No. PCT/US2012/000428, mailed Dec. 21, 2012, 6 pages.

Patent Cooperation Treaty, "International Preliminary Report on Patentability," issued in connection with Application No. PCT/US2011/038469, mailed Dec. 13, 2012, 10 pages.

Patent Cooperation Treaty, "International Search Report," issued in connection with Application No. PCT/US2011/038469, mailed Sep. 23, 2011, 4 pages.

Patent Cooperation Treaty, "Written Opinion of the International Searching Authority," issued in connection with Application No. PCT/US2011/038469, mailed Sep. 23, 2011, 7 pages.

International Bureau, "International Preliminary Report on Patentability," issued in connection with application No. PCT/US2012/000429, mailed on Apr. 17, 2014, 7 pages.

International Bureau, "International Preliminary Report on Patentability," issued in connection with application No. PCT/US2012/000428, mailed on Apr. 17, 2014, 8 pages.

International Searching Authority, "International Search Report and Written Opinion of the International Searching Authority," issued in connection with application No. PCT/US2014/028534, mailed on Aug. 5, 2014, 11 pages.

European Patent Office, "Extended European Search Report," issued in connection with European application No. 13186952.1, on Jan. 9, 2015, 9 pages.

United States Patent and Trademark Office, "Final Office Action," issued in connection with U.S. Appl. No. 12/816,152, on Jul. 9, 2013. (7 pages).

United States Patent and Trademark Office, "Non-Final Office Action" issued in connection with U.S. Appl. No. 12/816,152, on Nov. 20, 2012. (11 pages).

United States Patent and Trademark Office, "Non-Final Office Action" issued in connection with U.S. Appl. No. 14/044,832, on Nov. 6, 2014. (26 pages).

United States Patent and Trademark Office, "Non-Final Office Action," issued in connection with U.S. Appl. No. 12/816,152, on May 31, 2012. (13 pages).

United States Patent and Trademark Office, "Non-Final Office Action," issued in connection with U.S. Appl. No. 13/367,000, on Sep. 18, 2014. (28 pages).

State Intellectual Property Office, "Search Report with English Translation," issued in connection with application No. 2012800520005 on Apr. 20, 2015, 2 pages.

United States Patent and Trademark Office, "Notice of Allowance," issued in connection with U.S. Appl. No. 12/816,152, on Oct. 23, 2013. (18 pages).

Japanese Patent Office, "Office Action," issued in connection with application No. 2013-512066 on Apr. 21, 2015, 7 pages.

United States Patent and Trademark Office, "Non-Final Office Action," issued in connection with U.S. Appl. No. 14/349,628, on Jun. 2, 2015. (85 pages).

United States Patent and Trademark Office, "Restriction Requirement," issued in connection with U.S. Appl. No. 14/349,629, on Jul. 31, 2015. (10 pages).

Somfy, "Motor Catalog" , Sonfy Systems, Inc., Dec. 2013, http://www.usautomated.com/vendors/catalogs/somfy/Motor_Catalog.pdf, 78 pages.

Somfy, "Motor for Awnings", Somfy LT CSI WT—Automatic manual over-ride, http://www.somfy.co.uk/product/en-uk/lt-csi-wt/1440.cfm?channel=pro, retrieved on Nov. 22, 2010, 1 page.

Somfy, "The Motor With Back-Up Operation for Terrace Awnings", http://www.somfy.co.uk/product/en-uk/lt-csi-rts/1439.cfm?channel=pro, retrieved on Nov. 22, 2010, 1 page.

Somfy, "Sunea RTS CMO Universal Performance", Somfy Systems, Inc. North America Headquarters, Aug. 2009, 2 pages.

Somfy, "Sunea RTS CMO (Compact Manual Override)", Somfy Systems Inc., Feb. 2015, 1 page.

Patent Cooperation Treaty, "International Preliminary Report on Patentability", issued in connection with international application No. PCT/US2014/028534, on Sep. 15, 2015, 6 pages.

United States Patent and Trademark Office, "Final Office Action," issued in connection with U.S. Appl. No. 14/044,832, on Dec. 8, 2015, 53 pages.

United States Patent and Trademark Office, "Non-Final Office Action," issued in connection with U.S. Appl. No. 14/349,629, on Dec. 17, 2015, 51 pages.

United States Patent and Trademark Office, "Notice of Allowance," issued in connection with U.S. Appl. No. 14/349,628, on Jan. 6, 2016, 48 pages.

United States Patent and Trademark Office, "Final Office Action," issued in connection with U.S. Appl. No. 14/044,832, on Dec. 28, 2016, 87 pages.

Columbian Patent Office,"Examination Report," issued in connection with application No. 14-093599, on Nov. 12, 2016, 12 pages.

United States Patent and Trademark Office, "Non-Final Office Action," issued in connection with U.S. Appl. No. 14/044,832, on May 19, 2016, 38 pages.

United States Patent and Trademark Office, "Final Office Action," issued in connection with U.S. Appl. No. 14/349,629, on Jun. 27, 2016, 44 pages.

United States Patent and Trademark Office, "Non-Final Office Action," issued in connection with U.S. Appl. No. 14/349,629, on Nov. 1, 2016, 47 pages.

United States Patent and Trademark Office, "Non-final Office Action," issued in connection with U.S. Appl. No. 14/044,832, dated Mar. 20, 2017, 44 pages.

United States Patent and Trademark Office, "Notice of Allowance," issued in connection with U.S. Appl. No. 14/349,629, dated May 16, 2017, 83 pages.

\* cited by examiner

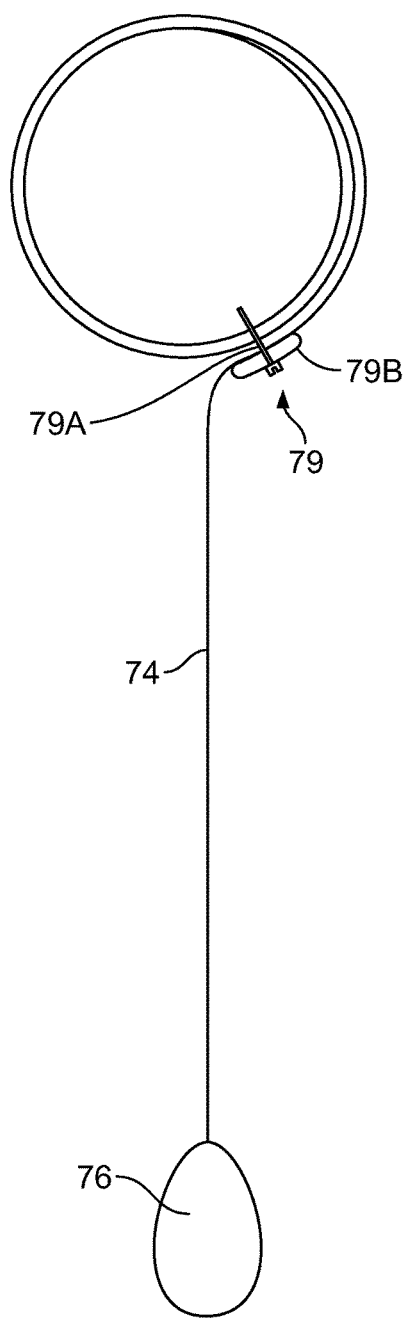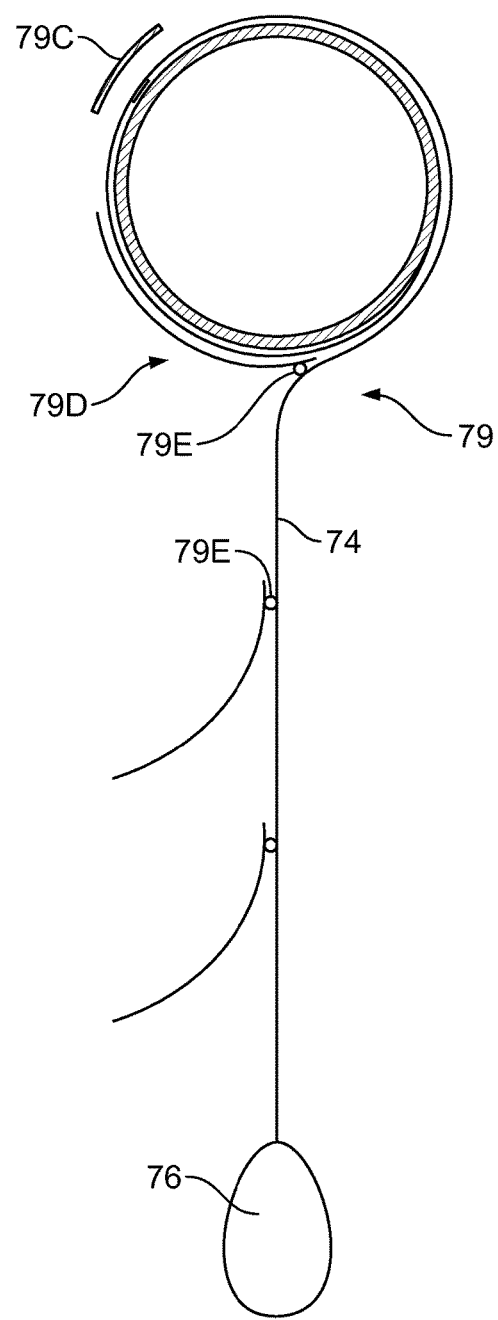
FIG. 3B
FIG. 3C

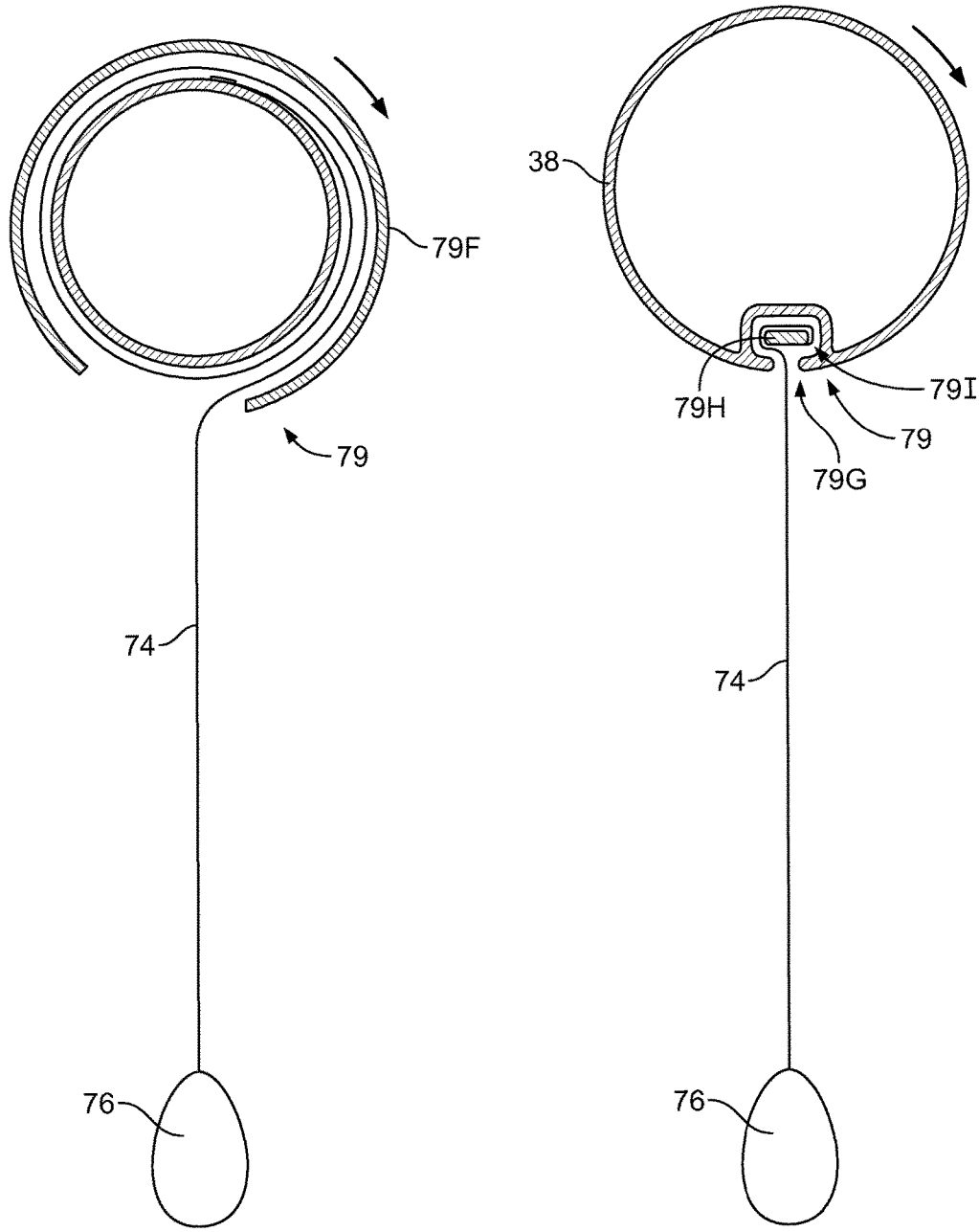
FIG. 3D  FIG. 3E

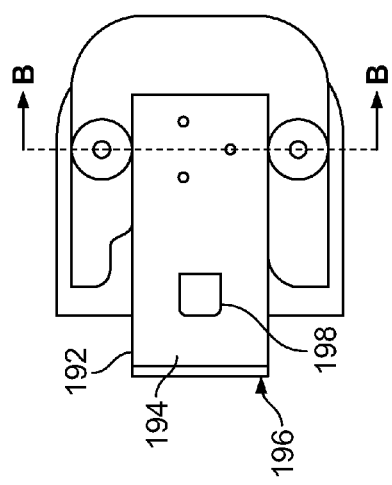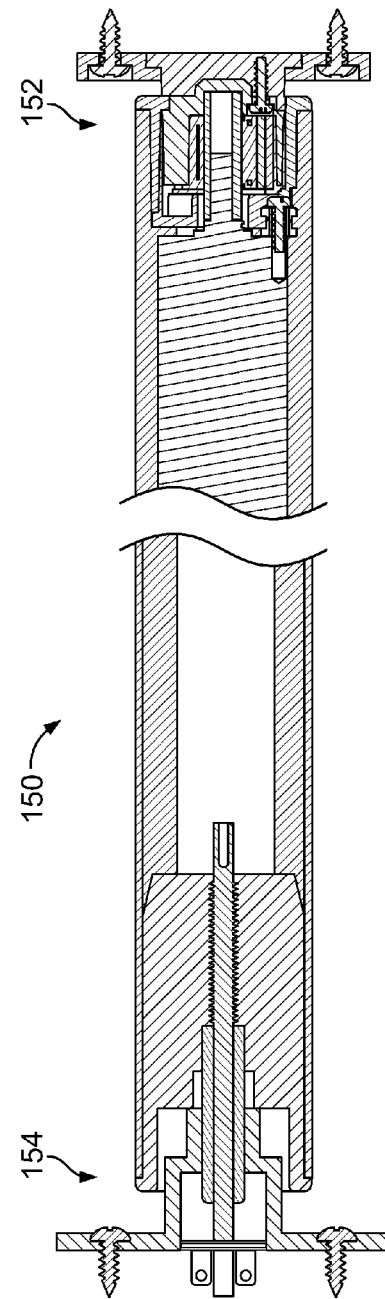
FIG. 10A
FIG. 10B

ARCHITECTURAL OPENING COVERINGS POWERED BY ROTARY MOTORS

RELATED APPLICATIONS

This patent is a national stage of PCT Application No. PCT/US11/38469, filed May 28, 2011, entitled "ARCHITECTURAL OPENING COVERINGS POWERED BY ROTARY MOTORS," which claims the benefit of U.S. Provisional Application No. 61/349,610, filed May 28, 2010, entitled "ROLLER BLIND POWERED BY ROTARY MOTOR WITHOUT LIMITER SWITCHES, OPTIONALLY WITH A QUICK-RELEASE SLIP-RING," the entire disclosures of which are hereby incorporated by reference in their entirety.

BACKGROUND

Architectural opening coverings such as roller blinds provide shading and privacy. Such coverings typically include a motorized roller tube connected to covering fabric, which may be slatted or louvered. The fabric can be fitted with a bottom rail and optionally run through a pair of opposing vertical frame or track members, one for each side edge of the fabric, so that the fabric raises and falls in a designated path and is not subjected to motion from, for example, blowing wind.

BRIEF DESCRIPTION OF THE DRAWINGS

Example implementations of architectural opening coverings will be described through the use of the accompanying drawings, which are not to be considered as limiting, and in which:

FIG. 3B illustrates a configuration for limiting the drop of a roller type architectural opening covering;

FIG. 3C illustrates another configuration for limiting the drop of a roller type architectural opening covering;

FIG. 3D illustrates another configuration for limiting the drop of a roller type architectural opening covering;

FIG. 3E illustrates another configuration for limiting the drop of a roller type architectural opening covering;

FIG. 10a is an elevational view of the proximate portion of the assembly of FIG. 9, with sectional lines B-B;

FIG. 10b is a cross sectional plan view of the assembly of FIG. 9 along sectional lines B-B identified in FIG. 10a;

DETAILED DESCRIPTION

Figure 1:
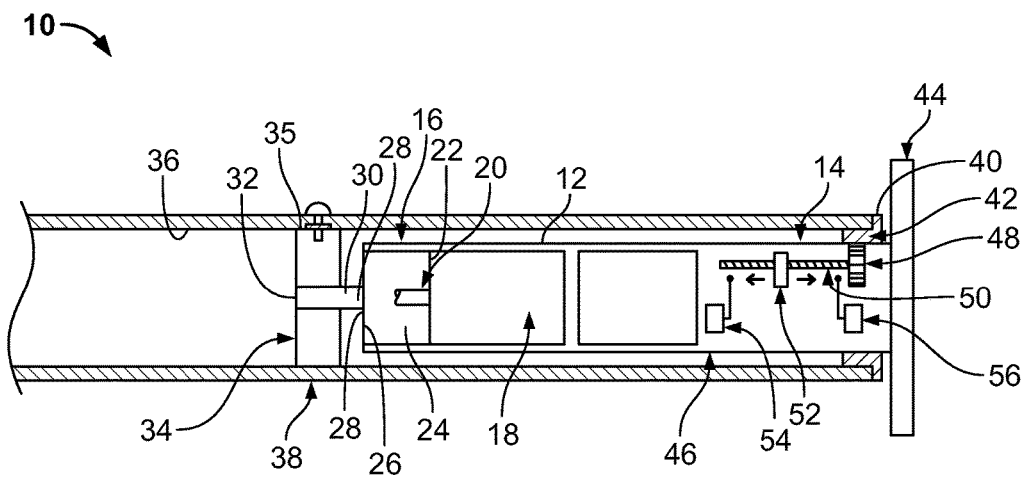
FIG. 1 illustrates a prior art motor.

To lower a roller type architectural opening covering such as a blind with a weighted rail, the weight of the rail, as well as the integral weight of any unwound covering fabric, is sufficient to draw the fabric from a roller tube. Accordingly, the motor torque used to unwind the covering is utilized to prevent this weight from unwinding the covering at an uncontrolled rate. Therefore, the resultant direction of torque applied by a motor during an unwinding process tends in a direction which opposes the unwinding of the covering (i.e., in the winding direction).

Typical motors employed in architectural opening coverings are capable of applying motor torque in the unwind direction. This can result in problems if an obstruction is encountered. Examples of problems in a typical outdoor blind include accumulated debris in the blind head-rail, such as ice, leaves, a bird's nest, etc., which prevent unwinding of the blind at the source.

Coverings in a track can present other obstacles, such as an obstruction in the track path. These obstructions can be any of those mentioned or can be, e.g., permanent obstructions in an outdoor blind such as a window mounted air conditioner, etc. Faced with such obstructions, a bottom rail would come to rest on the obstruction while the weight of the covering fabric would cause it to bunch up in the tracks.

The application of motor torque in the unwinding direction, during an obstructed unwinding operation, causes the motor to continue to unwind fabric despite the fact that the fabric is constrained. For coverings obstructed in the head-rail, unwinding under motor torque can unravel fabric around the roller tube until the head-rail is jammed with material (fabric and material are used interchangeably herein). For coverings obstructed in a track, unwinding with motor torque can cause fabric to jam in a head-rail as well as push the material out of the track and/or jam the material in the track. This is more serious than in a configuration without a track, where less damage is likely to occur by the continued free flowing of fabric out of a head-rail.

In view of the above challenges, when unwinding a rotary type architectural opening covering, some examples disclosed herein provide a roller motor configuration which is unable to apply torque in the unwinding direction. Without the application of torque in the unwinding direction, the fabric, with its weight supported by an obstruction, will not continue to unwind from the roller tube.

Roller motors are also faced with challenges when winding a covering. During the winding process, if an obstruction prevents successful winding, an opposing torque is generated around the roller tube. Continued winding can strain the motor due to an excessive electrical current draw. Tearing of the covering fabric is also possible by a forced winding action.

In view of the above challenges, when winding a covering, some examples disclosed herein provide a roller motor configuration that slips against a roller tube upon being subjected to a threshold level of opposing torque during a winding operation.

Electrically connecting a roller motor at an architectural opening can also create problems. One type of prior art motor for powering a roller blind is motor 10, illustrated in FIG. 1.

With this and each additional illustration in this document, the motor components will be referenced in polar coordinates. For example, the axial coordinate runs along the longitudinal axis of the motor 10, the radial coordinate runs perpendicularly thereto and the circumferential coordinate runs in a circular direction in an end view of the motor 10. With the motor 10 in a plan view, "axial proximate" or "proximate" means closer to the right side of the figure. On the other hand, "axial distal" or "distal" means further from the right side of the figure.

The motor 10 includes a housing 12 with proximate 14 and distal 16 axial ends. Within the housing is a stationary motor 18. Connected to a distal end 20 of the motor is a proximate end 22 of a gearbox 24. Connected to a distal end 26 of the gearbox 24 is a proximate end 28 of a drive shaft 30.

A distal end 32 of the drive shaft 30 is connected to a crown coupling 34, which is connected at its radial outer surface 35 with the internal surface 36 of a roller tube 38 for a covering. On the proximate end of the housing 14, a radial outer surface 40 of a passive ring 42 also connects with the inner surface 36 of the roller tube 38. This configuration provides a balancing support for the roller tube 38.

To power the motor 18, leads (not illustrated), connected to the motor 18, extend through the proximate side 14 of the motor housing 12, through a stationary bracket 44 connected to an architectural opening (not illustrated), and are hard wired to leads (not illustrated) extending from the architectural opening. Should one need to change the motor housing 12, these leads must first be disconnected, complicating the task.

In view of the challenge with wiring a motor housing at an architectural opening, some examples disclosed herein provide a roller blind motor configuration which is insertable into and removable from an architectural opening without requiring hard wiring of the motor to the architectural opening.

Limiter systems in the prior art roller blind motors can also create a challenge. Two types of limiter systems are common: a mechanical limiter system and an electronically programmable limiter system.

In the motor 10 illustrated in FIG. 1, a mechanical limiter system 46 is provided for tracking the wind state of fabric during winding and unwinding operations. The mechanical limiter system 46 includes the passive ring 42 which drives a gear 48, which in-turn drives a screw or worm 50. The action of the screw 50 axially advances or retracts a screw follower or worm gear 52 until one of a pair of switches 54, 56, are actuated, which disengages the motor 18.

The spacing of the switches 54, 56 and, thus, the vertical span for winding/unwinding the blind, is mechanically set by, for example, a pair of push buttons (not illustrated) located on the proximate end of the motor housing 14. The buttons are located so that they are exposed and can be actuated after the roller tube 38 and motor housing 12 are connected.

Figure 2:
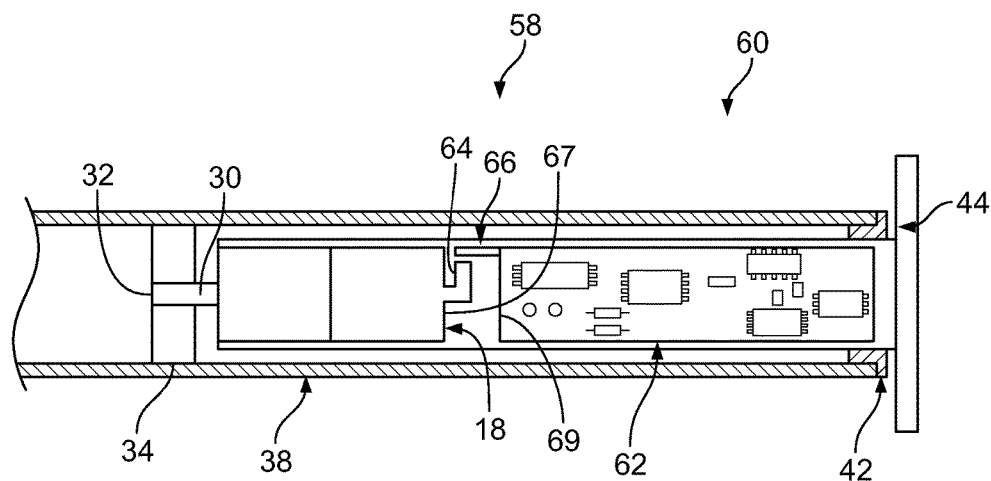
FIG. 2 illustrates another prior art motor.

An electronically programmed limiter system 58 utilized by a prior art motor is, illustrated in FIG. 2. The passive ring 42, in this instance, is not connected to a gear but serves as an additional support for the roller tube 38. A limiting system 60 includes a printed circuit board 62 and opposing electronic sensors 64, 66, one attached to the proximate end 67 of the motor and one attached to the distal end 69 of the printed circuit board 62. The sensor 64 connected to the motor 18 revolves with the motor shaft 30.

When the sensors 64, 66 pass each other, the number of consecutive revolutions of the motor shaft 30, and, thus, the related windings of the roller tube 38, are counted. From this information, the winding state of the fabric is deduced. When a predetermined number of passes between sensors 64, 66 has been counted, the system concludes that the covering is fully let-out or fully retracted; depending on the direction of rotation of the roller tube 38.

The structure required for both mechanical and electronically programmed types of limiter systems is complex and a source for repair over the life of a covering. Furthermore, resetting the mechanical and electronic limiting systems can be an arduous task for the installer and impractical option for the homeowner. Unfortunately, such resetting is often required during the life of a covering for various reasons. For example, resetting the limiter systems is required when a permanent obstruction is introduced, like a window mounted air-conditioner for an outdoor installation.

Additionally, a resetting process is required each time the covering is reinstalled in an architectural opening. Reinstallation is required when, for example, the covering is periodically removed for cleaning and/or service. During such process, it is not likely that the person removing the covering will reinstall the covering with the fabric in exactly the same wound or unwound state as when it was removed. If the wound state differs by any measurable amount, the motor operation will be out of sync with the covering. As a result, the motor will not wind/unwind the fabric completely or will over wind/unwind the covering.

An out-of-synch motor can create problems in the winding operation. One associated problem is illustrated with reference to FIG. 3A. This figure illustrates a roller tube 38 to which fabric 74 and a weighted bottom rail 76 are attached. A pair of end brackets 71 support the roller tube 38 and a pair of stops 73 extend from opposing ends of the rail 76. The roller tube 38 is encased in a head-rail 75, which is illustrated as having a circular cross section and having a circumferential slot-type opening 77. The opening 77, through which the fabric 74 extends, is circumferentially smaller than the size of the bottom rail 76.

Figure 3A:
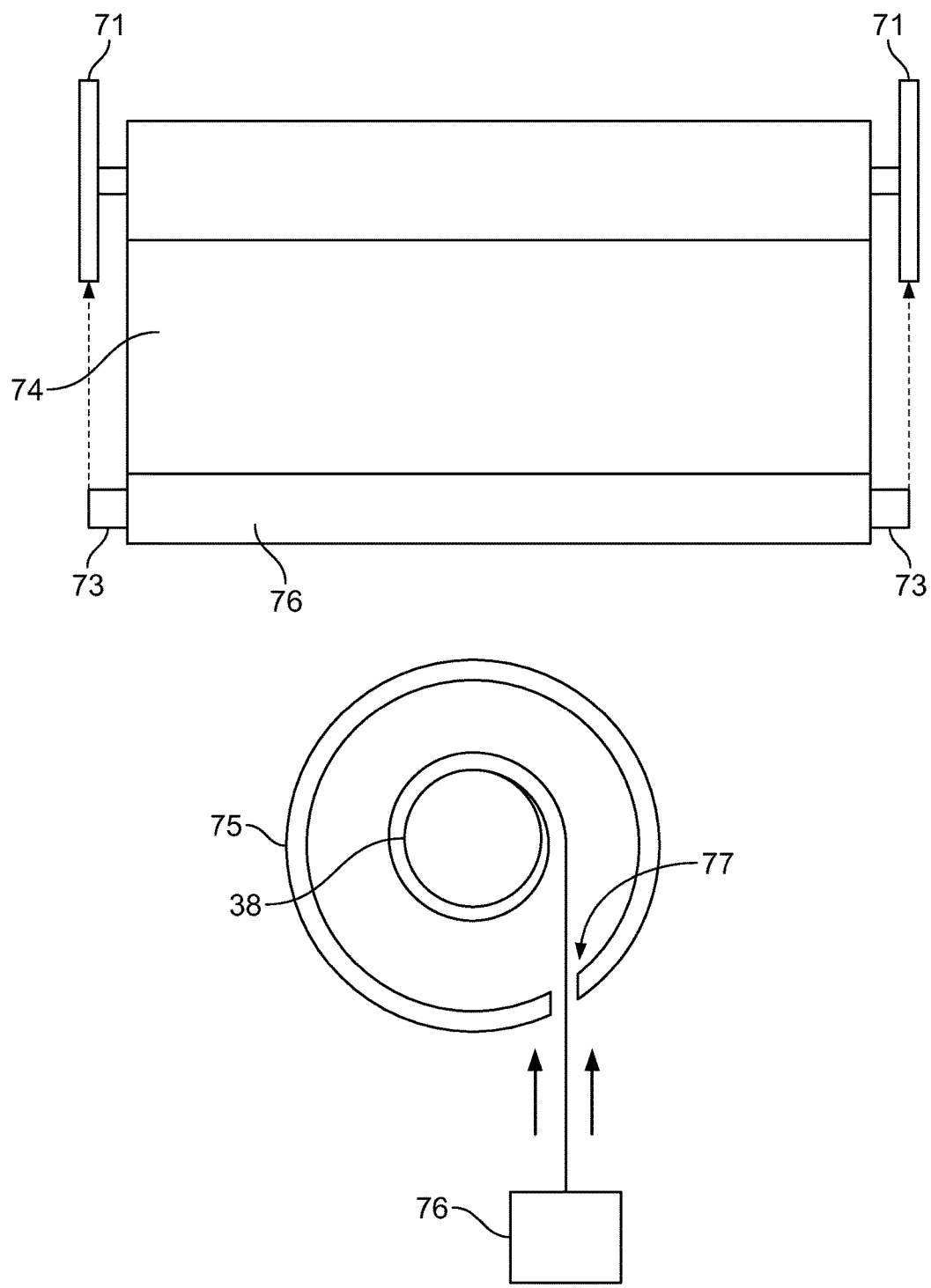
FIG. 3A illustrates a configuration for limiting the retraction of a roller type architectural opening covering.

As illustrated in FIG. 3A, one problem occurs when an out-of-synch motor attempts to wind a fully retracted fabric 74. Such action, with the stops 73 pressed against the end brackets 71, could result in straining the bottom rail 76 such that it bends into and jams in the opening 77 in the head-rail 75. On the other hand, if the motor does not wind the fabric 74 far enough, an unsightly overhang of the fabric 74 will remain after the retracting process concludes.

An out-of-synch motor creates different problems in the unwinding operation of the motor. Some problems are illustrated with reference to FIGS. 3B-3E. These figures illustrate several restraining means 79 for restraining excess fabric 74 against the roller tube 38. Such restraining means 79 are desirable to set the drop height of a standard length covering without requiring additional cutting and tailoring of the fabric 74.

In FIG. 3B, staples 79A and an axially extending stiffening member 79B form the restraining means 79. In FIG. 3C, the restraining means 79 include tape 79C. For example, clear packing tape may be wrapped around excess fabric and a topmost louver 79D in a louvered blind. In FIG. 3C, the louvers are soft and/or have a profile curve enabling the louvers to substantially fit against the curve of the wound blind. The louvers are also illustrated as being glued 79E to the blind.

In FIG. 3D, a circumferential spring clip 79F, extending axially along the full length of the fabric 74, forms the restraining means 79. In FIG. 3E, a cavity 79I with an axial slot 79G is formed in the roller tube 38 in which an end portion of the fabric 74 wraps around an axially extending constraining member 79H.

In FIGS. 3B-3D, unwinding the covering past the predetermined drop height would result in an effort by the motor to wind the fabric 74 so that it folds upon itself starting at the maximum unwound point. This folding would take the fabric 74 away from the final stop point, undesirably retracting the covering. This could also lead to excessive pulling of the fabric 74; resulting in jamming in the head-rail as well as potentially damaging the restraining means 79. For example, the staples 79A and tape 79C could be pulled off and the spring clip 79F could deform. In FIG. 3E, winding the fabric 74 in the wrong direction could lead to stripping the fabric 74 from within the cavity 79F.

In view of the challenges with setting and maintaining limiter systems, some examples disclosed herein provide a motor which does not require a limiter system for accurately winding and unwinding the covering.

Some examples disclosed herein provide a motor configuration which is unable to apply torque in an unwinding direction. In some such implementations, the example motor is configured to slip against a roller tube upon being subjected to an opposing torque at a threshold level during a winding operation. In some such implementations, the example motor is insertable into and removable from an architectural opening without requiring hard wiring of the motor to the architectural opening. In some such implementations the example motor does not require a limiter system for accurately winding and unwinding the covering, avoiding the need to have to set top and bottom winding points.

Figure 4:
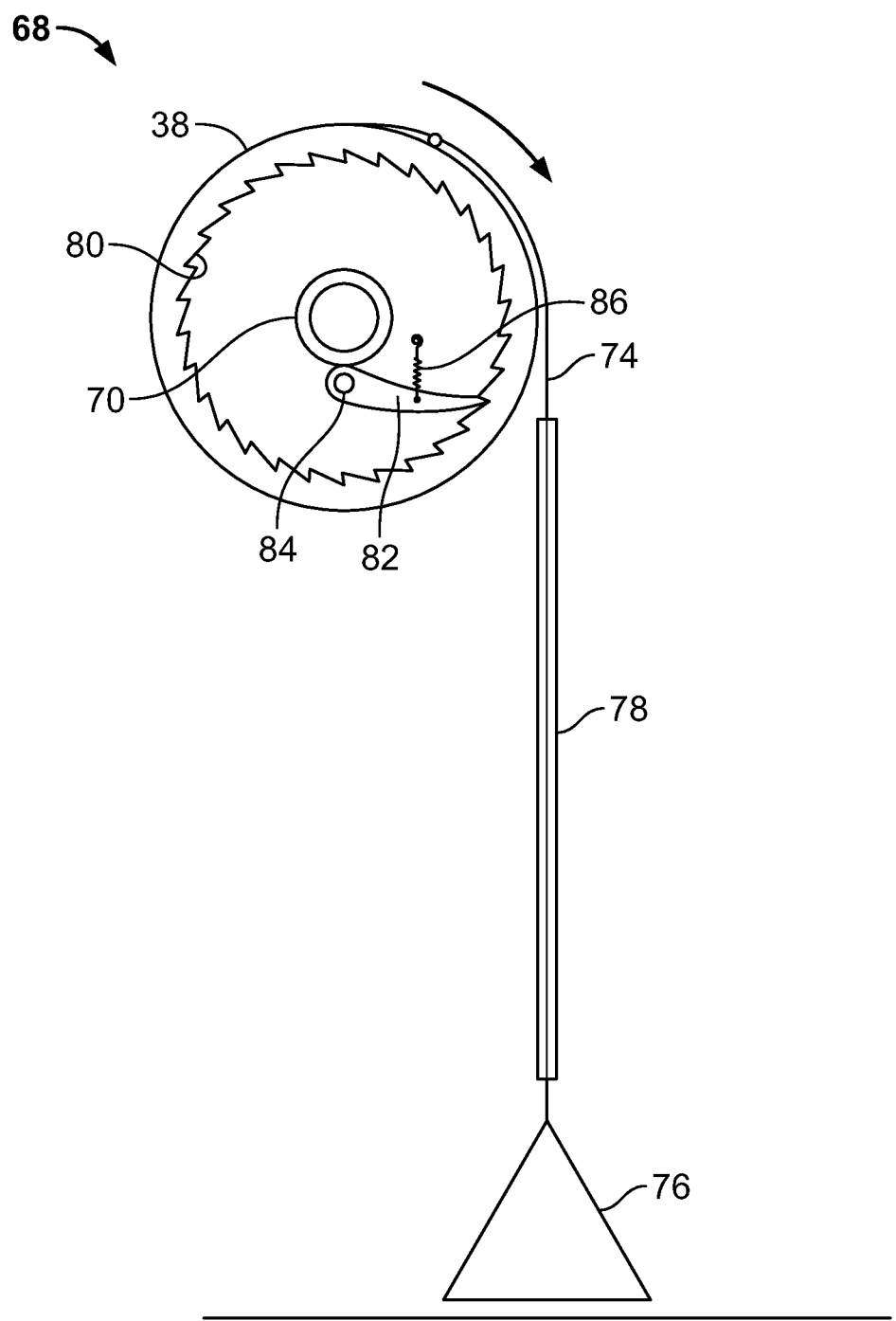
FIG. 4 illustrates a torque limiting motor configuration.

FIG. 4 illustrates an example torque limiting motor coupling 68 that prevents a motor from applying torque to a roller tube 38 in an unwinding direction. The example configuration of FIG. 4 includes, for example, a motor output shaft coupling 70 positioned on a motor shaft (not labeled). A roller tube 38 is illustrated as an outer diameter of the system, which is connected to the fabric 74 and, in turn, the weighted rail 76. A track 78 is also illustrated which guides the fabric 74 during winding and unwinding operations.

The motor output shaft coupling 70 functions as a ratchet crank, where ratchet gear teeth 80 are part of the inner diameter 36 of the roller tube 38 or are fitted thereto by an additional adaptor (not illustrated). A pawl 82 is connected to the motor output shaft coupling 70 by a pivot 84 and a compression spring 86.

While the motor shaft is unwinding the fabric 74, the pawl 82, locked against the gear teeth 80, prevents an uncontrolled unwind which could otherwise occur from the weight of the bottom rail 76. Similarly, when the motor shaft ceases unwinding or winds in the take-up direction, the motor output shaft coupling 70, with the pawl 82 locked against the gear teeth 80, enables winding of the roller tube 38 so as to raise the bottom rail 76 and retract the fabric 74 about the roller tube 38. In other words, the torque applied by this motor configuration, whether during an unwinding or winding operation, is in the winding direction.

While unwinding, should the roller tube become obstructed, for example, due to debris, the motor shaft 38 would still turn. However, the pawl 82 and the gear 80, slipping relative to each other, would be unable to apply torque in the unwinding direction.

If an obstruction is in the track, a similar outcome is achieved. When the rail 76 comes to rest on the obstruction, and the fabric 74 has bunched up in the track 78, the motor shaft 38 would still turn. Again, however, the pawl 82 and gear 80, slipping relative to each other, would be unable to apply torque in the unwinding direction. Without the application of torque in the unwinding direction, the fabric, with its weight supported by the obstruction, will not continue to unwind from the roller tube 38.

Figure 5:
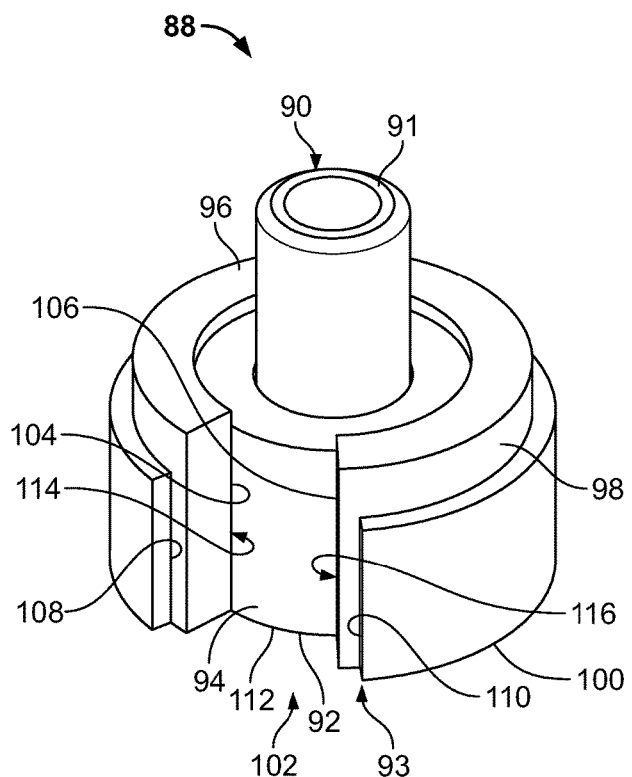
FIG. 5 illustrates a torque limiting motor coupling.

FIG. 5 illustrates an example implementation of a torque limiting motor coupling 88, which will now be discussed. As with the torque limiting motor coupling 68, the torque limiting motor coupling 88 is unable to apply torque in the unwinding direction. Furthermore, the torque limiting motor coupling 88 also slips against a roller tube upon being subjected to opposing torque at a threshold level in a winding direction.

Figure 6:
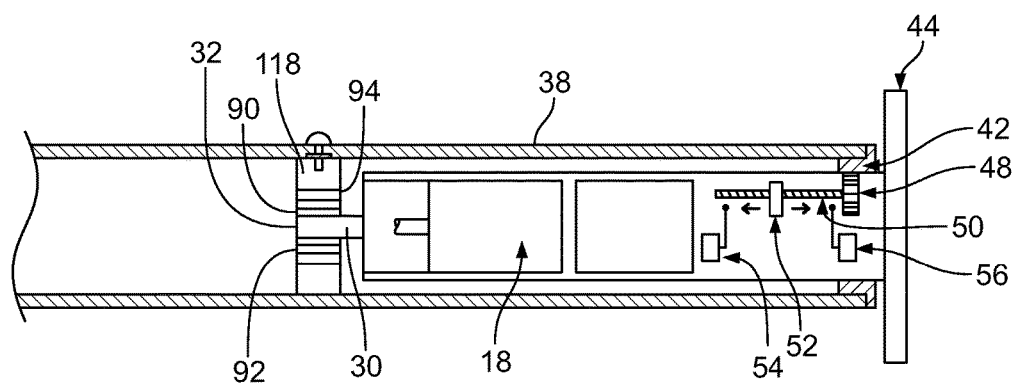
FIG. 6 illustrates the prior art motor of FIG. 1 fitted with the torque limiting motor coupling of FIG. 4.
Figure 7:
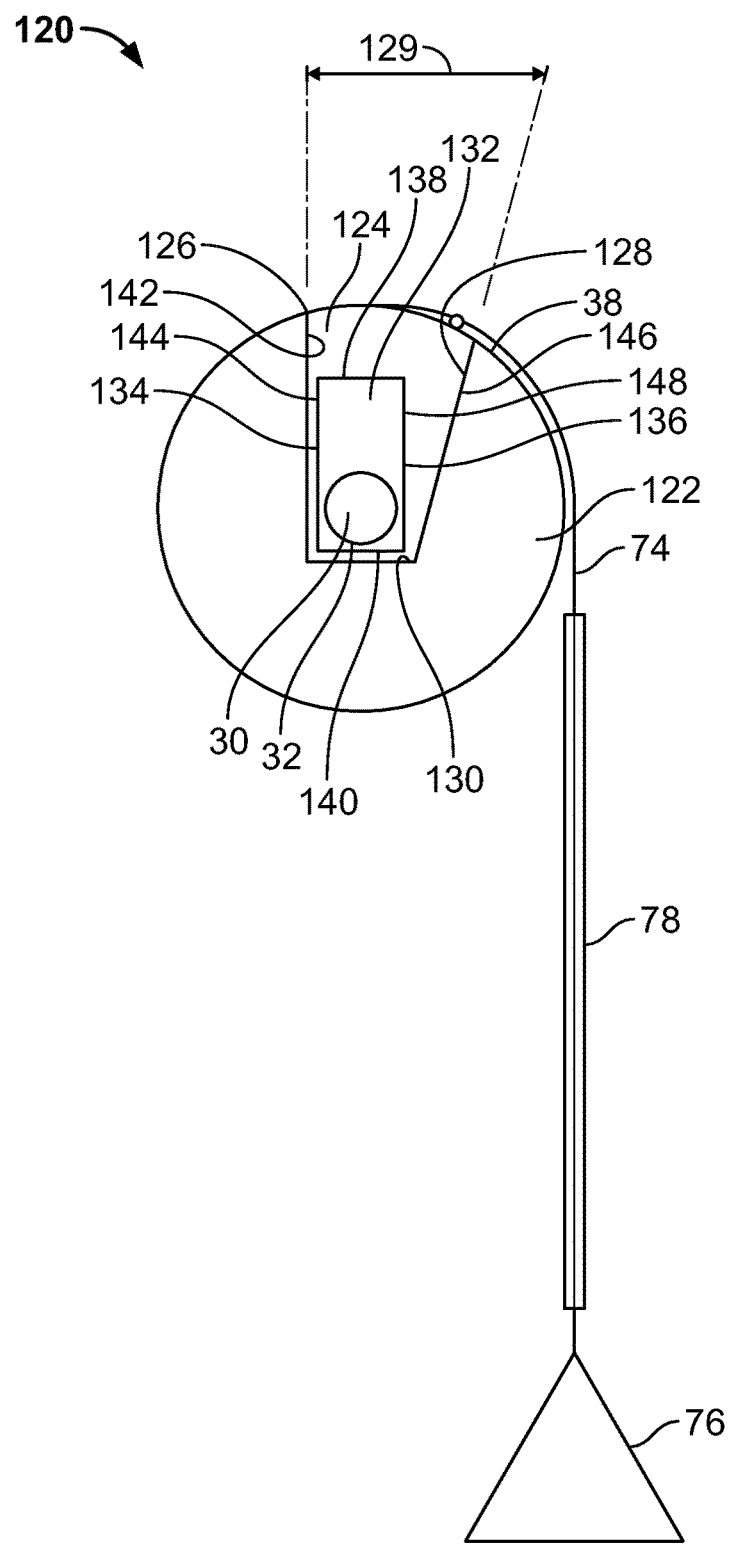
FIG. 7 illustrates another torque limiting motor configuration.
Figure 8:
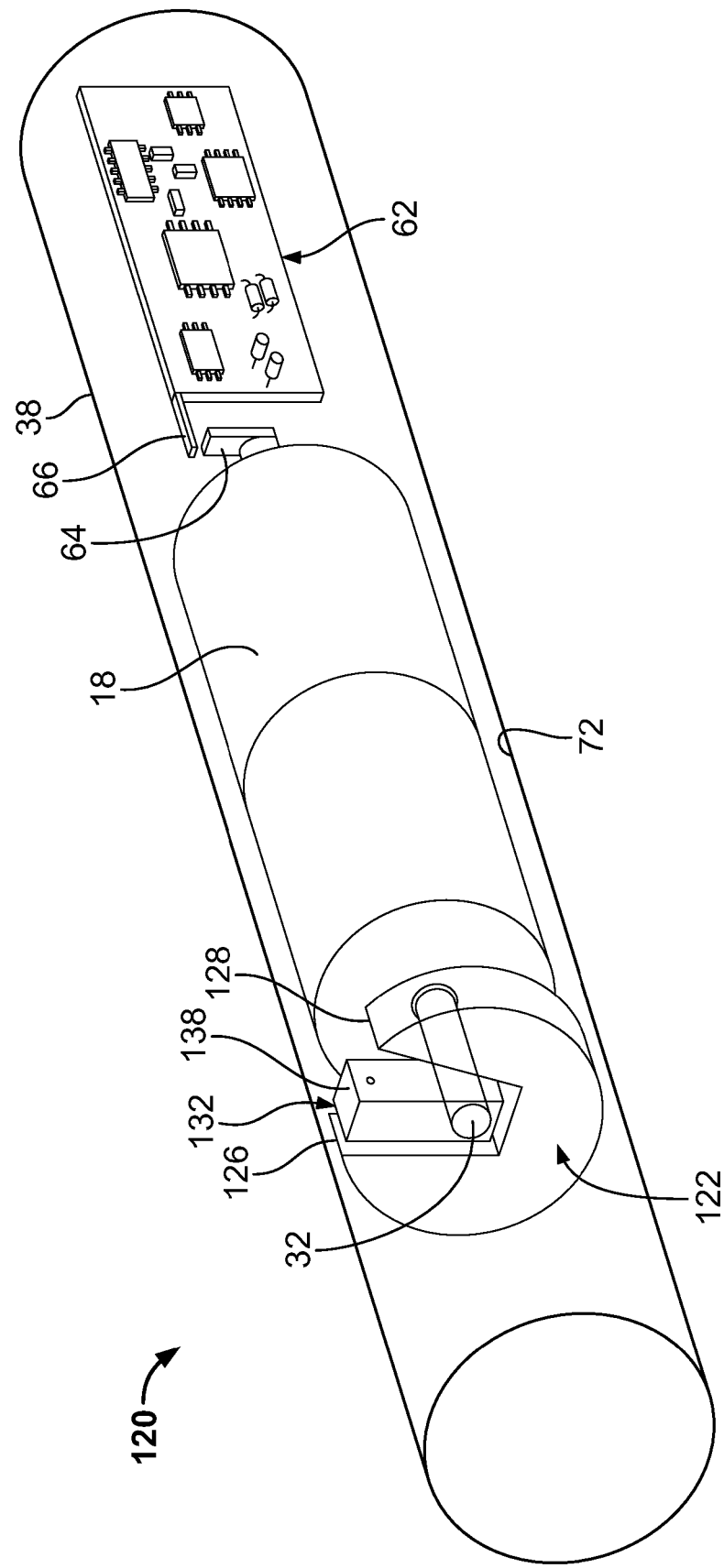
FIG. 8 illustrates the prior art motor of FIG. 2 fitted with the torque limiting motor configuration of FIG. 7.

FIGS. 6-8 illustrate example applications of the torque limiting motor coupling 88, wherein the torque limiting motor coupling 88 is retrofitted to the motor 10 illustrated in FIGS. 1 and 2. This discussion illustrates an example application of the torque limiting motor coupling 88, and supports the discussion of the example application of the torque limiting motor coupling 88, illustrated in FIGS. 9-12, and discussed below.

Turning to FIGS. 5 and 6, the motor coupling 88 includes an adaptor shaft 90, which is a keyed cylinder, adapted to fit outside of the distal end 32 of the shaft 30 of, for example, the motor 18. Surrounding the adaptor shaft 90, centered between opposing proximate end 91 and distal end, 93 of the adaptor shaft 90, is a one-way bearing 92.

Functionally, the one-way bearing 92 is analogous to the ratchet-pawl configuration of the torque limiting motor coupling 68. That is, due to the one-way rolling of the outer bearing race with respect to the adaptor shaft 90 (and thus with respect to the shaft 30), the motor 18 is unable to apply torque in the unwinding direction. A difference between the torque limiting motor coupling 88 and the ratchet-pawl configuration 68 is, for example, the bearing is quieter than a ratchet-pawl configuration. Furthermore, the torque limiting motor coupling 88 does not require a pivotable pawl 82 and also does not require a mating gear structure 80 in the roller tube 38.

On the outer race 94 of the bearing 92, a slip-clutch 96 is provided. The slip-clutch 96 is designed to slip against the bearing 92. Holding the slip-clutch 96 in place, on its radial outer surface 98, is a spring 100. The selection of the spring 100 (e.g., the spring force of the spring) defines the threshold torque required to slip the slip-clutch 96 against the bearing 92. The slip-clutch 96 is not illustrated in FIG. 4; however, it can be integrated into that configuration as well.

In the example torque limiting motor coupling 88 of, for example, FIG. 5, the bearing 92, the slip-clutch 96 and the spring 100 are axially centered relative to each other and have substantially the same axial dimension. The example shaft 90 is longer than the bearing 92, the slip-clutch 96 and the spring 100. Among other things, this provides the proximate end 91 and the distal shaft end 93 with a small amount of material for spacing the bearing 92, the slip-clutch 96 and the spring 100 from the axial base of the adapter shaft 90.

The axial buffer zone on both sides of the torque limiting motor coupling 88 enables reversing the torque limiting motor coupling 88 depending on whether a motor is placed on the left or right hand side within a roller tube, due to, for example, the location of available wiring. Reversing the torque limiting motor coupling 88 is achieved by sliding the adaptor shaft 90 off of the motor shaft 30 and reinstalling the adaptor shaft 90 so that the distal end 93 of the adaptor shaft 90, rather than the proximate end 91, faces the distal end 20 of the motor 18.

An example cavity 102 is defined between opposing, circumferentially spaced edges 104, 106 of the slip-clutch 96 and edges 108, 110 of the spring 100, rendering the slip-clutch 96 and spring 100 "C" shaped. Specifically, a base 112 of the cavity 102 is the outer race 94 of the bearing 92. A first side 114 of the cavity 102 is defined by aligned edges 104, 108 of the slip-clutch 96 and the spring 100. A second side 116 of the cavity 102 is defined by aligned edges 106, 110 of the slip-clutch 96 and the spring 100.

Figure 11:
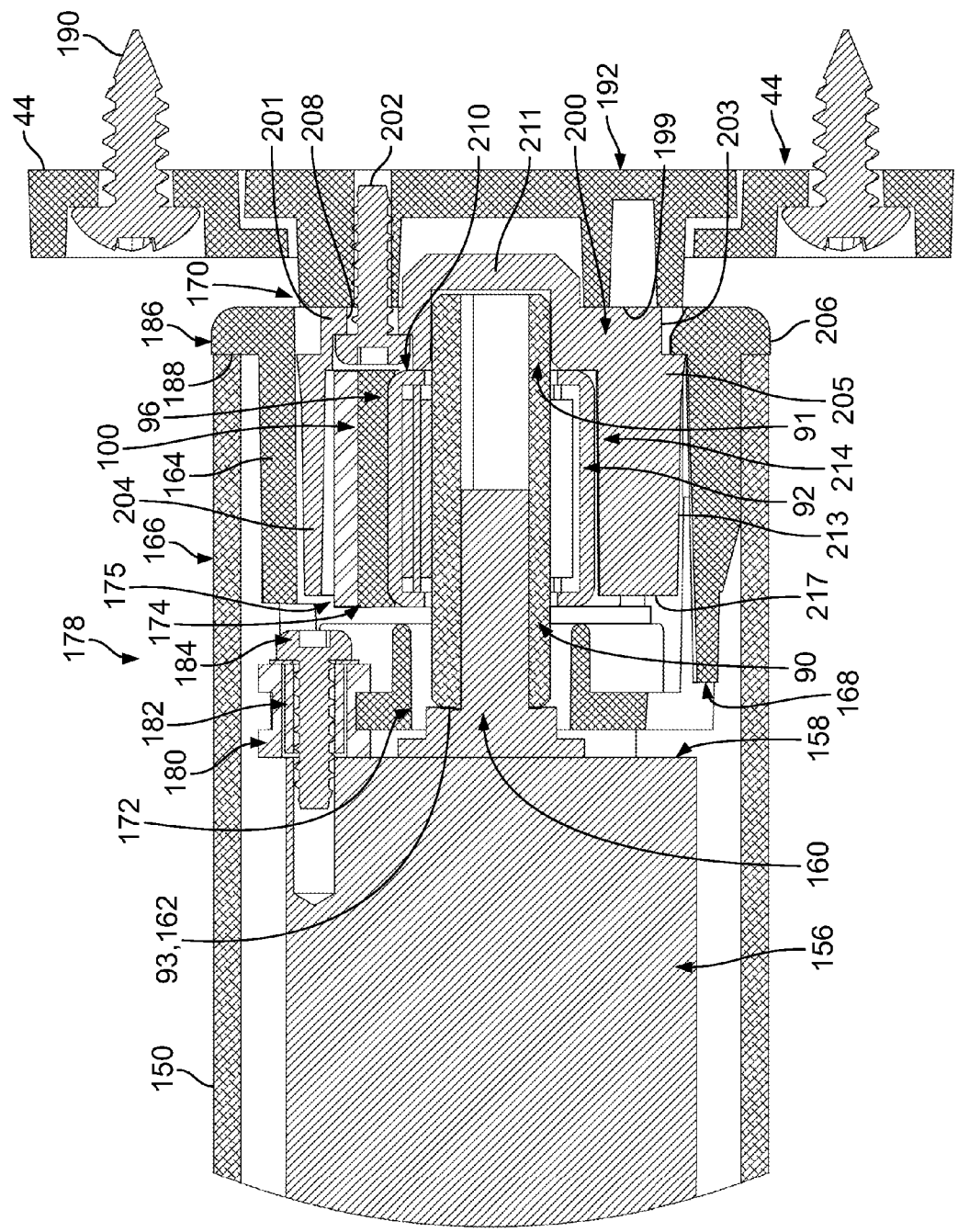
FIG. 11 is a magnified cross sectional view of the proximate end of the assembly as illustrated in FIG. 10b.
Figure 12:
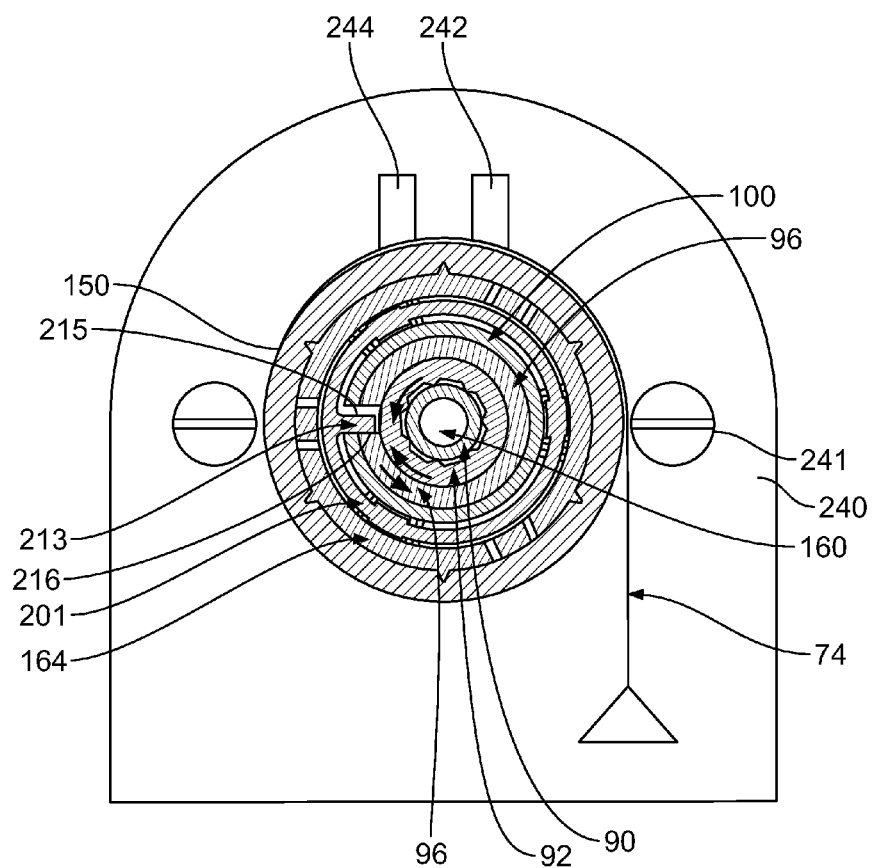
FIG. 12 is a magnified version of FIG. 10d, illustrating the torque limiting motor coupling and the distal side bracket in the background.

The example cavity 102 may be mated with a tang manufactured in a modified crown coupling 118. An example tang 213 is illustrated in FIG. 11, and discussed below. The example tang 213 of FIG. 11 has a radial inner surface 214 which does not reach the bearing 92, as well as opposing circumferential surfaces 215, 216. The tang 213 moves circumferentially between opposing sides 114, 116 of the cavity 102 so that one of the tang surfaces 215, 216 presses against a respective one of the sides 114, 116 of the cavity 102, whereby the tang 213 rotates with the slip-clutch 96. Thus, the modified crown coupling 118 is capable of rotating with the motor shaft 30.

Depending on the direction the tang moves in the cavity 102, the bearing 92 will either roll or lock. If locked, the slip-clutch 96 will slip when torque at the threshold limit is applied. Accordingly, if a covering is obstructed during a winding operation, the slip-clutch 96 slips when the torque of the motor 18 reaches the threshold limit. The shaft 30 then spins, without spinning the roller tube 38 as long as torque above this threshold limit is maintained, preventing overstraining of the motor 18 or the fabric of the covering.

The slip-clutch 96 configuration should be selected so that slip occurs at a greater torque than required to wind the fabric. On the other hand, the configuration should be selected so that slip occurs at a lower torque than required to strain the motor 18.

As an alternative to the slip-clutch 96, the motor 18 can be equipped with an overload system including one or more sensors. For example, a mechanical torque based sensor and/or an electrical current (e.g., amperage) based sensor (not illustrated) may be used. This type of system would shut off the motor 18 after mechanically sensing torque which exceeds a threshold and/or sensing a current draw which exceeds a threshold.

Before discussing the example application of the torque limiting motor coupling 88 in FIGS. 9-12, it is noted that the torque limiting motor coupling 88 is suitable for implementation with the motor 18 of FIG. 1 but not in the motor 18 of FIG. 2. As will now be examined, the torque limiting motor coupling 88 will not affect the relationship between the mechanical limiter system 46 and the actual wind state of the covering in the motor 10 of FIG. 1, but will affect the relationship between the limiting system 60 and the actual wind state of the covering in the motor 58 of FIG. 2.

In the motor 18 of FIG. 6, when the shaft 30 spins without the roller tube 38 spinning during, for example, an obstructed winding or unwinding operation, the passive ring 42 also does not spin and, therefore, the screw follower 52 does not advance towards either switch 54, 56. With this type of configuration, automatic timers may be used to time out the system and avoid continual running of the motor 18.

In an operation immediately following an obstructed winding or unwinding operation, the screw follower 52 would engage the appropriate switch 54, 56 when the covering is successfully wound or unwound. That is the free spinning of the shaft 30 does not skew the relationship between the mechanical limiter system 46 and the roller blind fabric 74.

On the other hand, were one to include the torque limiting motor coupling 88 in the motor 58 of FIG. 2, free spinning of the motor 18 during an obstructed winding or unwinding operation would cause the sensors 64, 66 to pass each other with each revolution of the motor 18, despite the fact that the roller tube 38 is stationary. The motor electronics 62 would falsely determine that the covering is being unwound or wound.

Accordingly, FIGS. 7 and 8 illustrate a torque limiting motor configuration 120 that may be used with the motor 58 of FIG. 2. This configuration 120, as with the torque limiting motor coupling 88, does not apply torque in the unwinding direction.

The configuration 120 includes an alternative crown coupling 122, which is connected to the inner surface 72 (shown in FIG. 8) of the roller tube 38. The crown coupling 122 of the illustrated example is a solid disk with, for example, a cavity 124 defined by a fifteen degree cut-out 129. The cavity 124 of the illustrated example has first and second sides 126, 128 and a base 130.

A motor shaft coupling 132 is connected to the distal end 32 of the shaft 30 and axially aligned with the crown coupling 122. The motor shaft coupling 132 of the illustrated example is an elongated rectangular shaped member, connected at one end to the shaft 30. The motor shaft coupling 132 has opposing sides 134, 136 which can toggle between the opposing sides 126, 128 of the crown coupling 122 when the motor 18 changes rotational directions. The approximately fifteen degree angle between opposing sides 126, 128 allows the motor shaft coupling 132 to pivot from one side of the cavity 124 to the other. Similarly, top and bottom edges 138, 140 of the motor shaft coupling 132 are sized to ensure that the motor shaft coupling 132 can pivot from one side of the cavity 124 to the other.

During an unwind operation, the weight of the rail 76 presses the side 126 of the cavity 124 against the side 134 of the motor shaft coupling 132. To control the descent of the blind, the torque applied by the motor is in the winding direction.

When an obstruction prevents unwinding so that the weight of the rail 76 is not pulling fabric from the roller tube 38, the roller tube 38 will stop spinning because the motor 18 is applying torque in the winding direction. However, the motor shaft coupling 132, which still turns from the motor action, will advance towards the opposing side 128 of the cavity 124. This separates the side 126 of the cavity 124 from the side 134 of the motor shaft coupling 132. Communication of this separation is transmitted to the motor controller electronics 62 by, for example, one or more sensors 142, 144, which may be mechanical, magnetic, electromechanical, etc. The electronics 62 then stops the motor 18 and, therefore, prevents the motor 18 from applying torque in the unwinding direction, which would unroll the fabric from the roller tube 38 while the fabric is not falling due to the obstruction.

In the illustrated example, additional sensors 146, 148 on the opposing cavity 124 and motor shaft coupling 132 side surfaces 128, 136 render this configuration reversible as well. However, in the example of FIG. 7, contact between any of the sensors is not required on the retracting phase, or at least at the start of that phase because the mating sides 126, 134 (or, in the reversed configuration, sides 128, 136) would be separated at the onset of the winding operation if, for example, an obstruction stopped the previous unwinding operation.

On the other hand, an obstruction could be identified in the winding direction by configuring the pairs of sensors 142, 144 and 146, 148 to sense different levels of applied force between contacting surfaces 126, 134 and 128, 136. When the applied force exceeds a threshold, a determination could be made that an obstruction is present on the take-up cycle, and the motor 18 could be disengaged. Alternatively, an electronic torque sensor, motor amperage sensor, etc. could disengage the motor 18 upon sensing the effects of an obstruction in the winding operation.

Turning to FIGS. 9-12, example implementation of the torque limiting motor coupling 88 in a rotary motor 156 will now be discussed. The example rotary motor 156 is powered by a timed-pulse of current. The bearing 92 and the slip-clutch 96 of the torque limiting motor coupling 88 enable the use of the rotary motor 156 with a timer (not illustrated) rather than using a stationary motor with a limiter system. As the timer electronics are separate from the rotary motor 156, the rotary motor 156 can be much smaller and lighter than stationary motors equipped with limiting systems. According to the illustrated example, while the stationary motor is described as having a drive shaft that rotates with respect to the architectural opening, the example rotary motor 156, as described in further detail herein, includes a drive shaft that remains stationary while the body (i.e., the casing, which is often labeled the stator) of the motor rotates to drive rotation of a roller tube.

Other benefits of some implementations of a timer with use of the illustrated example torque limiting motor coupling 88 on the rotary motor 156, over a motor with a limiting system, will now be discussed. As indicated, known limiter systems use set points to limit unwinding/winding a covering. The set points must be set and reset frequently. Without the proper configuration of the set points the problems associated with the discussion related to FIGS. 3A-3E, above, could result.

However, the operation of a timed motor is different. In some examples, when a timer period is calculated for winding/unwinding the blind, a buffer is added to the timer period. The example buffer ensures that, barring an obstruction, there will be a period of time after the completed winding/unwinding in which the motor keeps running. The buffer can be, for example, ten percent of the predicted wind time.

With the buffered time period determined and set in the example timing electronics, for the remainder of the life of the covering, regardless of the introduction of temporary or permanent obstructions, and regardless of whether the covering is removed and reinstalled, the covering will continue to operate without the need for set points or adjustments. This is because, as will be discussed, unlike known limiter systems, the example timed motor 156 is self-regulating.

For example, with the motor 156 equipped with the torque limiting motor coupling 88 and a timer, when a full winding/unwinding operation is successful, the motor 156 keeps running during the buffer period when the blind has come to rest. Before the motor 156 times out, if winding, the torque of the motor 156 reaches the threshold level, causing the slip-clutch 96 to slip against the bearing 92, avoiding the problems associated with the discussion of FIG. 3A. Similarly, if unwinding, the outer bearing race rolls with respect to the adaptor shaft 90 (and, thus, with respect to the drive shaft of the motor 156) after the bottom rail of the covering comes to rest or an obstruction is encountered, avoiding the problems associated with the discussion of FIGS. 3B-3E. After timing out, the motor 156 is ready for running in the reverse direction in the next operation.

Faced with an obstruction during a winding/unwinding operation, the torque limiting motor coupling 88 of the illustrated example will respond as described with reference to FIGS. 5 and 6. The example motor 156, however, instead of deactivating due to limiter switches, will time out. In other words, when an obstruction is encountered, the example motor 156 will continue to run while the covering is stationary until the timer stops the motor 156.

An additional benefit of some example implementations of the torque limiting motor coupling 88 with a timed motor 156 is realized following a partially successful unwinding/winding operation, (e.g., obstructed winding/unwinding operation). In such an instance, neither timer electronics nor the motor 156 is aware of the state of the roller fabric 74. For example, an obstruction in a track may allow the fabric 74 to unwind or wind by only fifty percent before the timer stops the motor 156. Therefore, upon removing the obstruction and restarting the motor 156, an effort to continue in either operational direction would be fifty percent too long (plus the buffer time).

Without the torque limiting motor coupling 88, the timed motor 156 would induce the problems associated with FIGS. 3A-3E in the next operation following a partially successful winding/unwinding. However, these problems are avoided in the illustrated example of the torque limiting motor coupling 88 for the same reasons they are avoided with a successful winding/unwinding operation, discussed previously. That is, in a successful winding/unwinding operation immediately following a partially successful winding/unwinding operation, the motor 156 will continue to run after the blind comes to rest because the blind will have a shorter distance to travel to be fully wound/unwound. Thereafter, when the motor 156 times-out, the motor 156 is correctly synchronized, (i.e., self-regulated), for further winding and unwinding operations. In other words, the covering will be fully wound or unwound and the timer period will be appropriate for fully unwinding or winding the blind, respectively.

In some examples, a remote control or wall switch which is programmed for "up" and "down" commands if used to control the covering. In such examples, no electronics need to account for the wound state of the covering. With the torque limiting motor coupling 88, there is no problem with accidentally hitting "up" or "down" in consecutive operations because the motor 156 cannot over-torque and damage the blind in the illustrated example.

Turning to FIGS. 9-12, an example implementation of the rotary motor 156 and the torque limiting coupling 88 will be discussed. The orientation of the example motor 156 in FIGS. 9-12 is reversed as compared with the orientation of the motor 18 in FIGS. 1 and 2, in that the motor shaft 160 in the example configuration of FIGS. 9-12 is on the right side of the motor 156 rather than the left side. However, the "distal" and "proximate" monikers have the same meaning here as before. That is, with the motor 156 in a plan view, "axial proximate" or "proximate" means closer to the right side of the figure. On the other hand, "axial distal" or "distal" means further from the right side of the figure.

In the example FIGS. 9-12, a roller tube 150 having a proximate end 152 and a distal end 154 encloses the motor 156 and the additional components. The torque limiting motor coupling 88 of the illustrated example is fitted on the proximate end 158 of the motor 156 (e.g., on the motor drive shaft 160), so that the distal end of the adaptor shaft 93 of the torque limiting motor coupling 88 is positioned against a distal end 162 of the drive shaft 160 of the motor 156.

An end cap 164, through which the motor drive shaft 160 connects with the torque limiting motor coupling 88, securely connects the motor 156 to the roller tube 150. This connection enables the motor 156 to turn with the roller tube 150, subject to slippage provided by the torque limiting motor coupling 88, as discussed below.

As shown in FIG. 11, the end cap 164 forms an axially extending cup-type cavity having a distal base portion 168, and which opens on its proximate end 170. The cap base portion 168 defines a radially central opening 172 which is large enough for the adaptor shaft 90 of the torque limiting motor coupling 88 to pass through.

The cap base portion 168 is axially between the proximate end 158 of the motor 156 and the distal end 174 of the bearing 92, slip-clutch 96 and spring 100 of the torque limiting motor coupling 88. This configuration enables removal of the torque limiting motor coupling 88 without disassembling the end cap 164 and the motor 156 from each other and from the roller tube 150. The rolling direction of the roller bearing 92 with respect to the motor shaft 160 can be reversed without extensive handling of the system to enable operation of the motor 156 in either a left-handed or right-handed assembly.

A small amount of axial play 175 is provided between the cap base portion 168 and the distal end 174 of the bearing 92, clutch 96 and spring 100 of the torque limiting motor coupling 88. This configuration prevents binding of these components during operation.

The cap base portion 168 is axially thick enough to seat and physically isolate motor mounts 178 from the torque limiting motor coupling 88. The motor mounts 178 include a plurality of circumferentially spaced rubber bushings 180, serving as vibration isolators, in which standoff mounts 182 and screws 184 are inserted for connecting the end cap 164 to the motor 156. In addition to the vibration isolation of the elastic material of the bushings 180, the example bushings 180 also axially space the end cap 164 from the motor 156, to further isolate vibrations of the motor 156.

The opened proximate end 170 of the end cap 164 includes a radially outward extending lip 186. The lip 186 seats against a proximate end 188 of the roller tube 150.

To fix the assembly of FIG. 11 to the proximate side of an architectural opening, the assembly is provided with a stationary wall bracket 44 and screws 190. The wall bracket 44 of the illustrated example can slidably receive a stationary tube bracket 192. The tube bracket 192 is removable and insertable into the wall bracket 44 via a flexible extension 194 with a grip portion 196. A clip 198 of the illustrated example securely connects the tube bracket 192 with the wall bracket 44 and can be released by flexing the grip portion 196.

Removing tube bracket 192 of the illustrated example from the wall bracket 44 removes the covering assembly from the architectural opening. On the other hand, inserting the tube bracket 192 into the wall bracket 44 installs the covering assembly into the architectural opening.

In the illustrated example, the proximate end 200 of a drive ring 201 is fixedly connected to the distal side 199 of the stationary tube bracket 192. These components are connected via, for example, circumferentially spaced screws 202. The drive ring 201 of the illustrated example is an axially extending cup-type cavity having a proximate base 203, which opens on its distal end 204. The distal end 204 has a diameter enabling it to fit into the opening in the proximate end 170 of the end cap 164. A radially inward step 205 at the drive ring base 203 is adapted for being releasably gripped by circumferentially spaced flexible gripping members 206 formed at the end cap lip 186.

The drive ring base 203 of the illustrated example is axially thick enough to seat and encase the screws 202 in countersunk openings 208. The drive ring 201 is configured such that when it is inserted into and encased by the end cap 164, a distal surface 209 of the drive ring base 203 sits against the proximate end 210 of the bearing 92, slip-clutch 96 and/or spring 100 of the torque limiting motor coupling 88.

The drive ring base 203 of the illustrated example includes an adaptor shaft support cavity 211. The cavity 211 which is an axially extending cup-type cavity formed in the radial center of the drive ring base 203. The cavity 211 opens into the drive ring 201. The support cavity 211 is large enough to seat the proximate portion 91 of the adaptor shaft 90. The shaft 90 extends axially past the proximate end 210 of the bearing 92, clutch 96 and spring 100 components of the torque limiting motor coupling 88.

As indicated above, in the illustrated example, the length of the distal portion 93 of the adaptor shaft 90 is the same or substantially the same as that of the proximate portion 91 of the adaptor shaft 90. This enables fitting the distal portion 93 in the support cavity 211 for reversing the torque limiting motor coupling 88 about the motor shaft 160, depending on whether the covering is a left-handed or right-handed assembly.

Between the distal end of the drive ring base 209 and the distal end of the drive ring 204, the above mentioned tang 213 is provided. When inserted into the end cap 164, the distal end of the tang 213 of the illustrated example, which defines the distal end of the drive ring 204, is axially flush or substantially flush with the distal end of the bearing 92, clutch 96 and/or spring 174. This geometry provides a solid connection between the tang 213 and the cavity 102 in the torque limiting motor coupling 88.

As the drive ring 204 and tang 213 of the illustrated example are stationary, movement in the motor 156 translates into rotating the motor 156, not the tang 213. The connection between the motor 156 and the roller tube 150 via the end cap 164 turns the roller tube 150 with the motor 156 so long as the motor 156 is not rolling against the tang 213 via action of the bearing 92 or slipping against the tang 213 via action of the slip-clutch 96.

The tube bracket 192 of the illustrated example is formed with an axially extending cup-type cavity 212. The cup-type cavity 212 open on the distal end 199 of the tube bracket 192 for receiving the drive ring support cavity 211. The tube bracket cavity 212 of the illustrated example is sized to seat and encase the screws 202 connecting the tube bracket 192 to the drive ring 201.

The above motor configuration provides a rotary drive motor 156 for the covering. This configuration differs from previous drive systems for coverings in which the motor is stationary. It also differs from previous systems in that the limiter system is replaced by electronics providing a timed-pulse of power combined with the torque limiting motor coupling 88. With these components, the rotary motor 156 is self-regulating when subjected to obstructions during a winding/unwinding operation and/or when the covering is removed and reinstalled.

Figure 13:
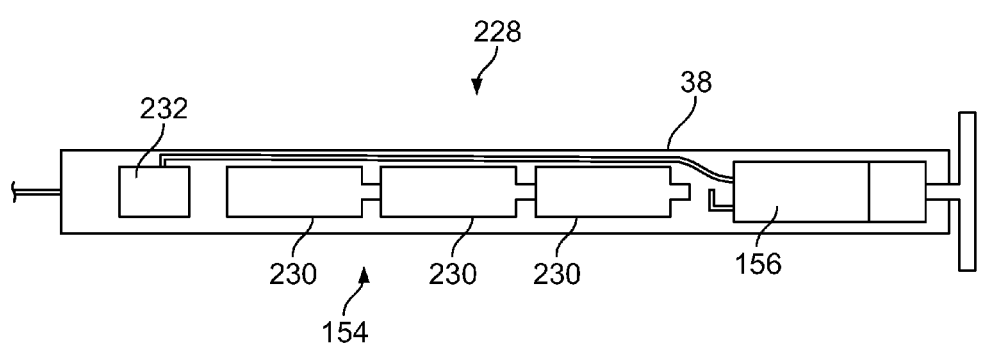
FIG. 13 illustrates the motor of FIG. 9 powered by batteries rather than through the quick-release slip-ring.
Figure 14:
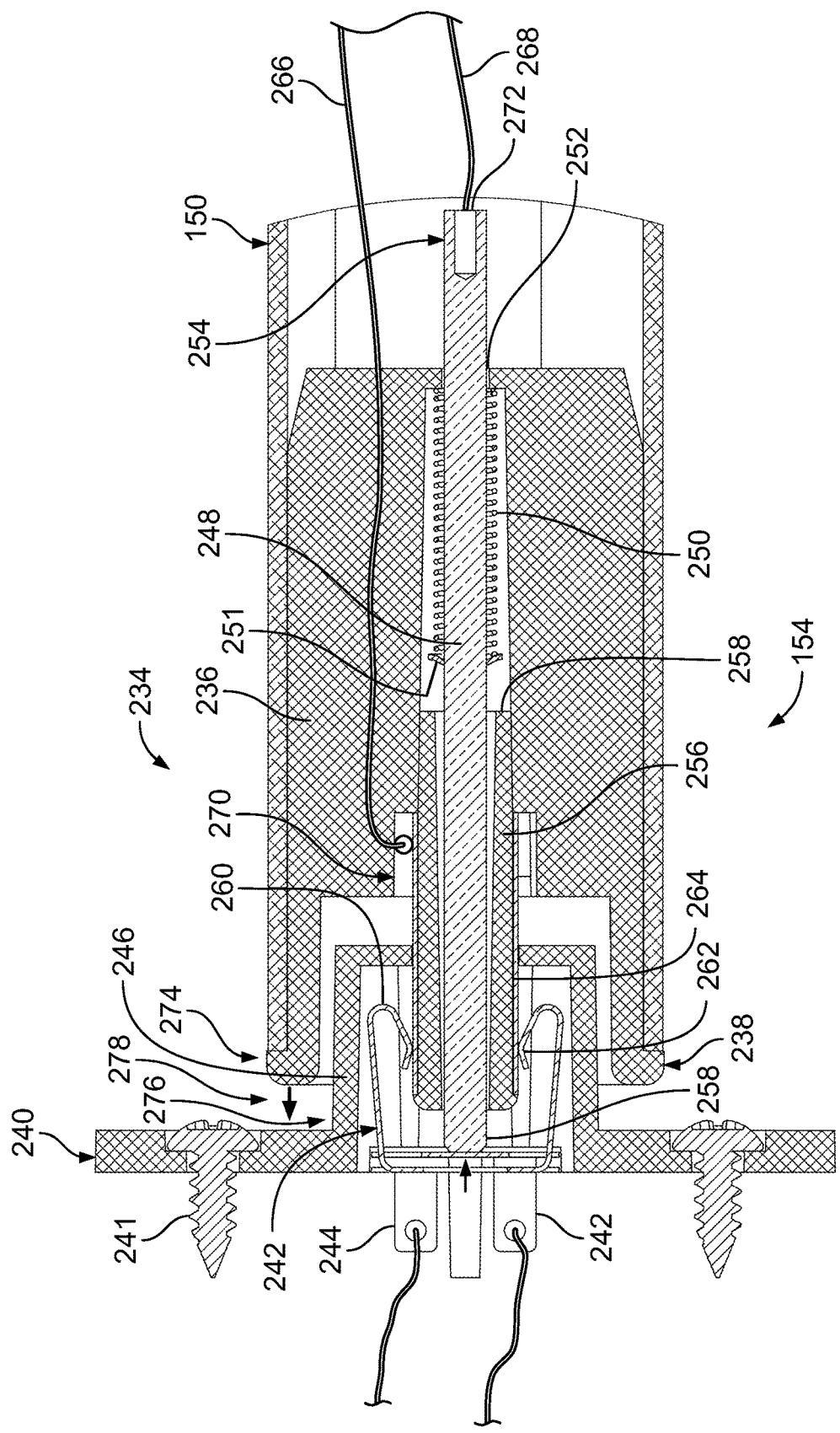
FIG. 14 is a magnified cross sectional view of the distal end of the assembly as illustrated in FIG. 10c, which illustrates the quick-release slip-ring.

Turning to FIGS. 13-14, an example structure for providing power to the motor 156 will now be illustrated and discussed. As indicated above, in a previous system, wire leads are fixedly connected to the motor (e.g., motor 18) through an architectural opening. Such a configuration has the drawback of rendering the blind assembly difficult to install and difficult to remove for servicing. Furthermore, such a configuration, by itself, would not work with a motor 156 that rotates with the roller tube.

As illustrated in FIG. 13, in an example configuration 228, to power the motor 156, batteries 230, which also spin within the roller tube 38, are provided. In addition, the configuration 228 includes a remote control switching device 232, which also spins within the roller tube 38 (i.e., rotates with the motor 156).

Figure 9:
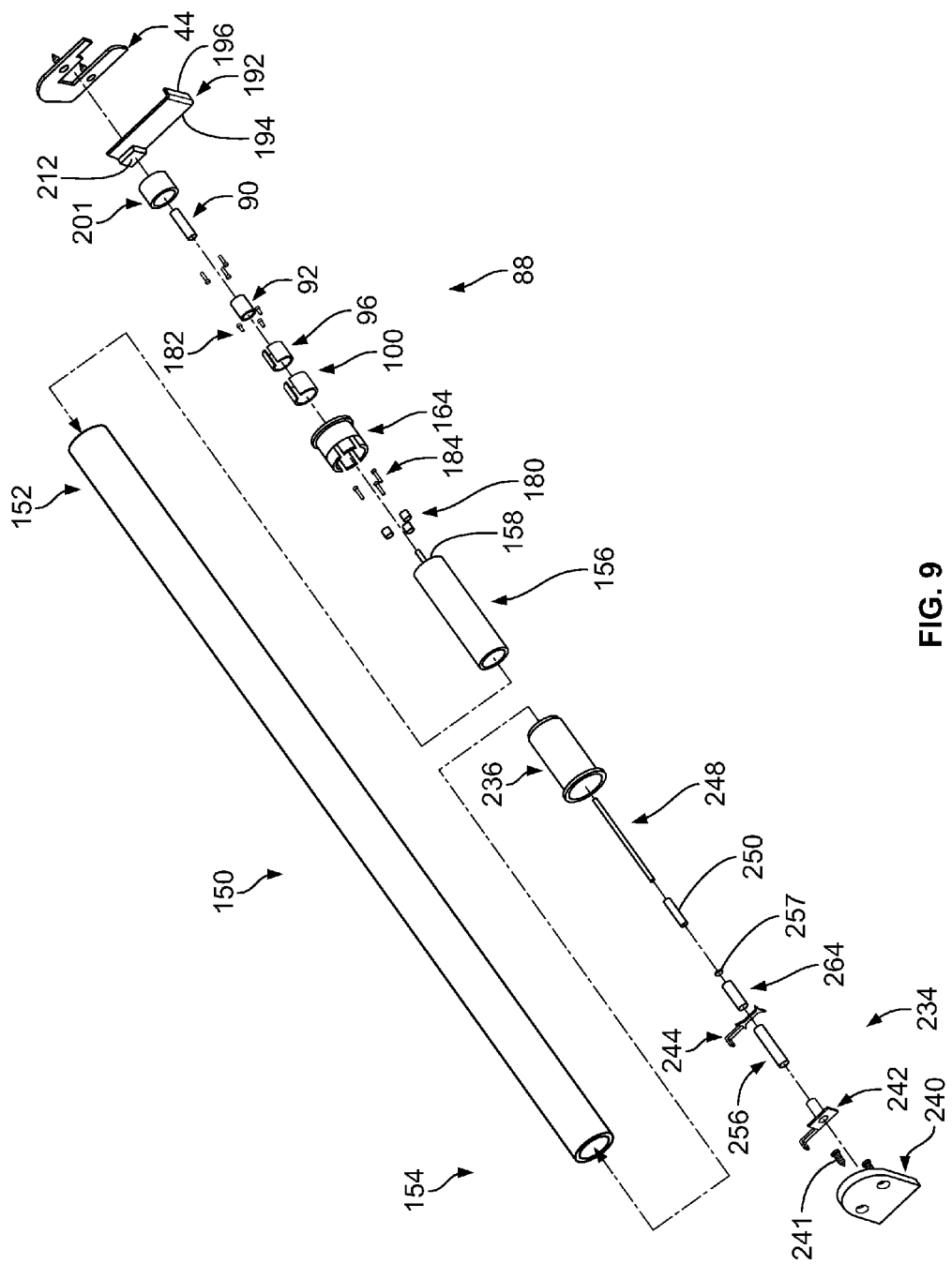
FIG. 9 is an exploded view of a covering assembly configuration which includes the torque limiting motor coupling of FIG. 5 and a quick-release slip-ring.
Figures 10C, 10D:
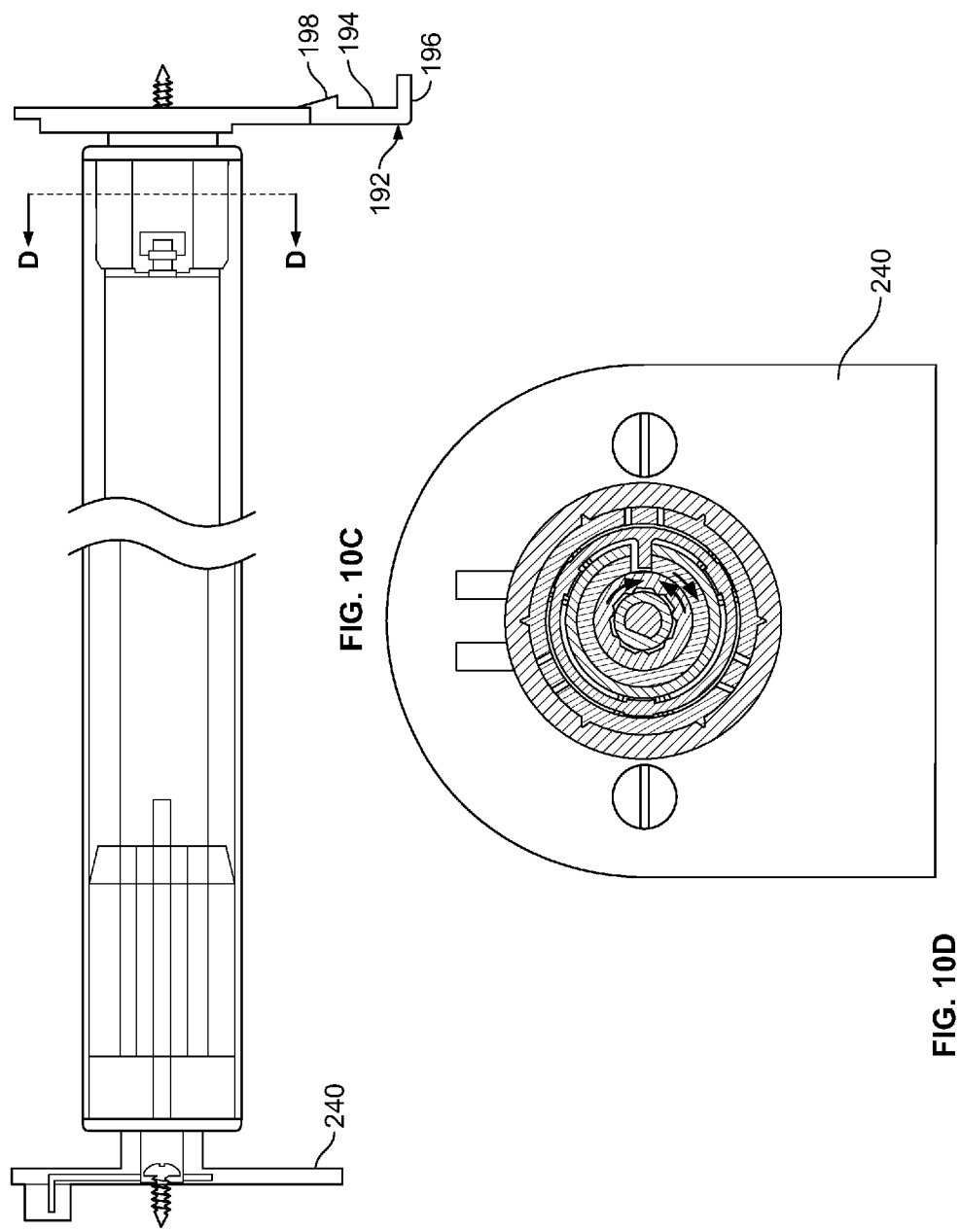
FIG. 10c is a plan view of the of the assembly of FIG. 9, with sectional lines D-D.
FIG. 10d is a cross sectional view of the axial proximate end of the assembly of FIG. 9 along sectional lines D-D identified in FIG. 10c, illustrating the torque limiting motor coupling and the distal side bracket in the background.

Alternatively, as illustrated in FIGS. 9, 10 and 14, a quick-release slip-ring 234 is utilized to carry power to the spinning motor 156. Such a slip-ring 234 serves as an electrical and mechanical disconnect point for the covering. The electrical connection is provided between a rotating slip-ring housing 236, at its distal end 238, and a stationary slip-ring housing 240, which is attached to an architectural opening (not illustrated) via, for example, screws 241.

Within the stationary slip-ring housing 240 of the illustrated example is a spring contact 242 and a flat contact 244, electrically separated from each other. One of these contacts 242, 244 is a hot contact and the other is a neutral contact. These contacts 242, 244 are positioned within a cavity 246 in the stationary bracket 240, similar in type to the cavity 211 in the tube bracket 174.

Centrally disposed within the rotatable housing 236 is a spring mounted pin 248 (e.g., a brass pin), with an associated compression spring 250 and spring seat 251 fixed at an axially intermediate location on the pin 248. An opening 252 in the proximate side of the housing 236 is large enough to allow a proximate end 254 of the pin 248 to pass, but not the spring 250. As such, the action of the spring 250 occurs between the radial opening 252 and the spring seat 251, forcing the pin 248 in the distal direction from within the housing 236.

An insulating sleeve 256 fixed at the distal end of the housing 236 has a proximate edge 258 against which the spring seat 251 comes to rest, thereby restraining the pin 248 within the sleeve 256 and the housing 236. When the slip-ring 234 is connected to the stationary bracket 240, the spring 250 forces the distal end 258 of the pin against the flat contact 244.

The spring contact 242 of the illustrated example comprises two contacts 260, 262, each extending axially from the cavity 246 and each bent radially inward to press against an exposed portion of a brass sleeve 264 on the outside of the insulating sleeve 256. Wires 266, 268 are soldered to respective points 270, 272 on the proximate end of the pin 248 and along a proximate end of the axial length of the brass sleeve 264. The solder point 270 on the brass sleeve 264 is positioned far enough towards the proximate end of the sleeve 264 to not obstruct axial motion of the contacts 260, 262 against the sleeve 264, as discussed below.

With the above configuration, when installed, an electrical connection exists between the contact 244, the pin 248 and the wire 268. An electrical connection also exists between the contact 242, the brass sleeve 264 and the wire 266. The wires connect to the motor 156 for completing the power circuit. One of the wires is connected to the hot contact on the motor 156 and one is connected to the neutral contact on the motor 156. Their connection to the pin 248 and brass sleeve 264 depends on which of these conductive members will be connected to the hot contact or neutral contact at the stationary bracket 240, which is determined in advance.

The rotatable housing 236 of the illustrated example includes a distal end lip 274, serving the same purpose of the proximate end lip in the end cap 164. An axially extending cup-shaped cavity 276 in the rotatable housing 236, which opens towards its distal end 238, is radially large enough to enable the contacts 260, 262 to flex against the brass sleeve 264.

The cavity 276 of the illustrated example is axially deep enough to allow for axial play 278 between the rotatable housing 236 and the stationary bracket 240 to account for variations in bracket spacing, which is a function of the size of the architectural opening. For the same reason, the axial length of the exposed portion of the brass sleeve 264 of the illustrated example, distal from the solder point 270 for the wire 268, matches that of the depth of the cavity 276. Similarly, the reach, from the pin 248 to the flat contact 244, accounts for the same variations in axial play 278.

Accordingly, the above disclosed examples provide quick-release slip-ring 234 which is capable of powering the motor 156 without permanently wiring the motor 156 to wires at an architectural opening. This configuration enables installing and removing motorized coverings much more quickly and easily than with typical connections.

A hard-wired slip-ring (not illustrated) could alternately be utilized. For example, the motor 156 could be operated in a same fashion even with a hard-wired slip-ring.

Examples disclosed herein provide a roller motor configuration which does not apply torque in the unwinding direction. Some such example motors are configured to slip when encountering a torque above a threshold during a winding operation. Some such example motors are also insertable into and removable from an architectural opening without requiring permanent wiring of the motor to the architectural opening. Some example motors do not require a limiter system for stopping the covering at the top and bottom of the stroke.

Figure 15:
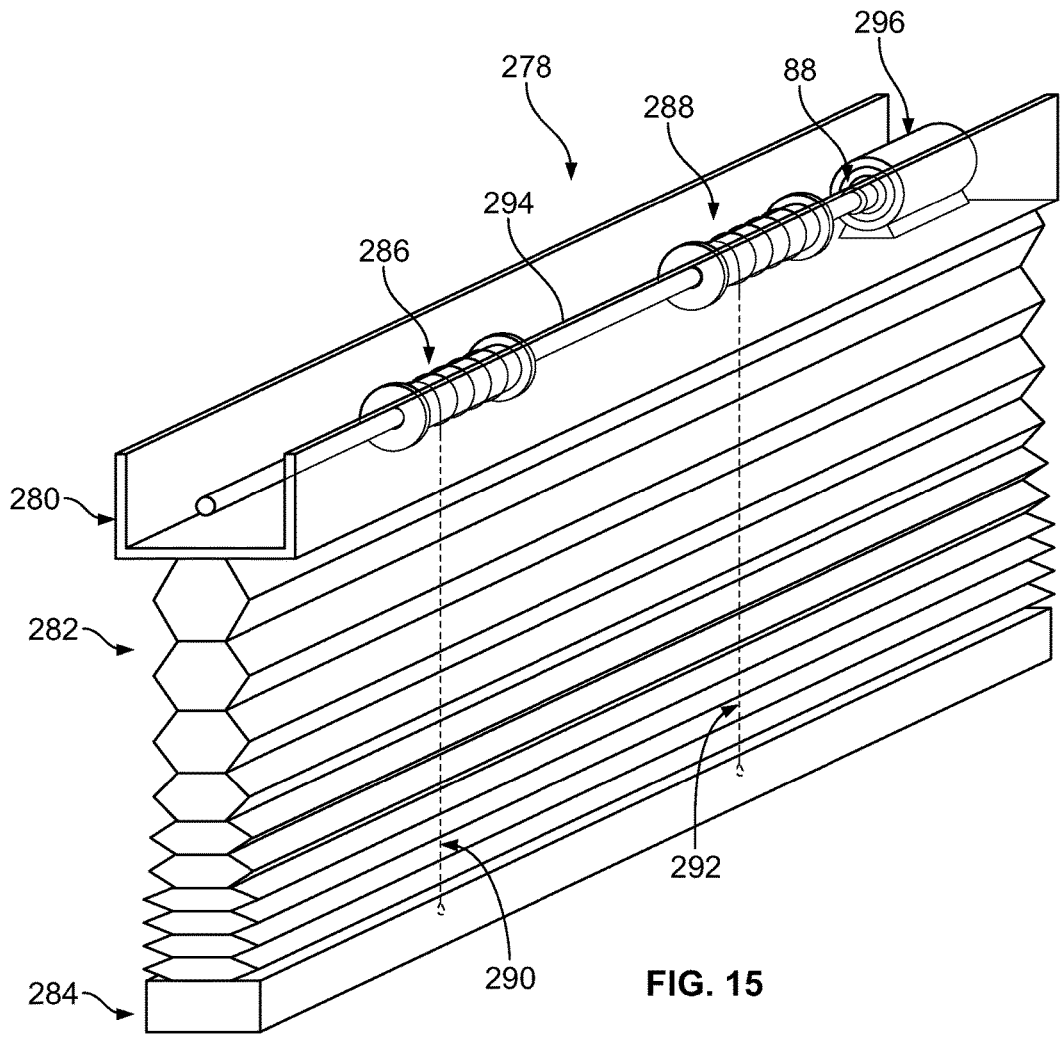
FIG. 15 illustrates a prior art window treatment fitted with the torque limiting motor coupling of FIG. 5.
Figure 16:
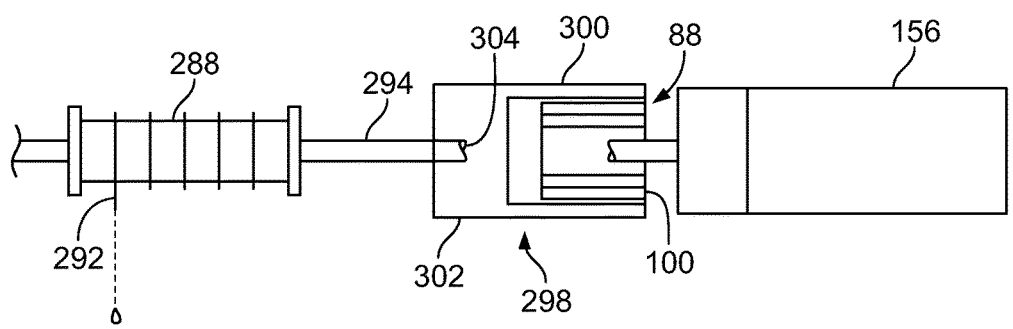
FIG. 16 is a magnified view of the motor and torque limiting motor coupling illustrated in FIG. 15.

Turning to FIGS. 15 and 16, there is illustrated another application of the torque limiting motor coupling 88 of FIG. 5. An example architectural opening treatment 278 is known in the industry as Duette by Hunter Douglas, of 2 Park Way, Upper Saddle River, N.J., 07458, in the United States. This treatment 278 includes a head-rail 280, a pleated fabric 282 and a bottom rail 284. A pair of lift spools 286, 288 are spaced within the head-rail 280, each having lift cords 290, 292 extending through the fabric 282. The lift spools 286, 288 are mounted to a single driven shaft 294 and controlled in unison by a motor 296.

As illustrated in FIG. 16, the prior Duette motor can be fitted with the torque limiting motor coupling 88 illustrated in FIG. 5. A coupling member 298, such as a cup-shaped cylinder 300, opening towards its proximate side, is fixedly connected to the spring 100 on the radial inner surface of the coupling member 298, directly or through an additional coupling. Furthermore, a base 302 of the coupling member 298 is fixedly connected to a proximate end 304 of the driven shaft 294.

In such a configuration, the window treatment 278 exhibits described torque limiting characteristics as explained above. That is, the motor in the Duette shade would not apply torque in the unwinding direction and would slip with respect to lift spools 286, 288 when encountering more than the threshold torque when winding.

Figure 17:
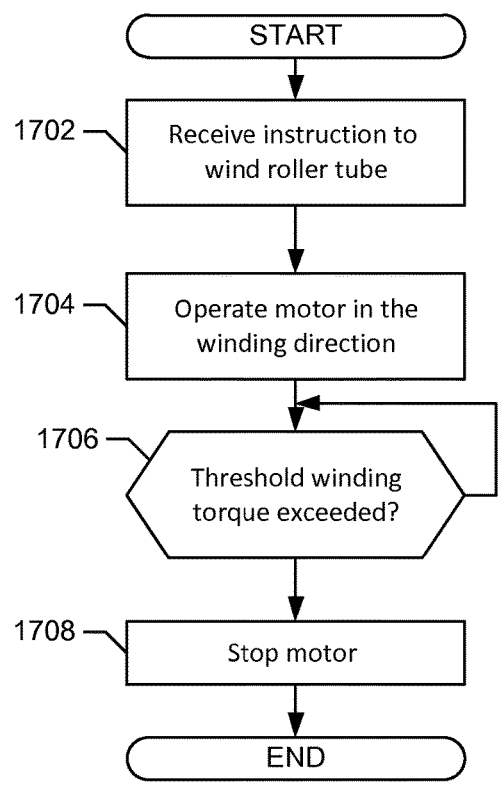
FIGS. 17-20 are flowcharts illustrating example methods to control operation of a roller type architectural opening covering.

FIG. 17 is a flowchart illustrating an example method to control operation of an architectural opening covering. The example method of FIG. 17 is described in conjunction with the roller tube 150 of FIG. 9. However, the example method may be used with any other covering.

The example method of FIG. 17 begins when a controller receives an instruction to wind the roller tube 150 (block 1702). For example, the controller may receive an instruction from a wireless remote control via a wireless receiver included with the controller, from a wired or wireless remote control, from a button on a control panel, etc. In response to the instruction, the controller operates the motor 156 in a winding direction (e.g., to raise a covering material attached to the roller tube 150) (block 1704). As previously described, the torque limiting motor coupling 88 prevents rotation of the output shaft of the motor 156. Accordingly, the radial body of the motor 156 and the roller tube 150 are rotated. The controller determines if the torque on the motor exceeds a winding torque threshold (block 1706). For example, when a covering is wound to its upper-most limit, a bottom bar or weight attached to the covering material will reach a frame of the covering and prevent rotation of the roller tube 150 around which the covering material is wrapped. This stoppage will cause the torque on the motor to increase beyond a threshold. The threshold can be selected so that normal winding (e.g., when no obstruction is present) does not exceed the torque threshold, but winding against a frame or obstruction will cause the threshold to be passed.

If the winding torque threshold has not been exceeded (block 1706), the motor 156 continues to operate until the threshold is exceeded. If the winding torque threshold has been exceeded (block 1706), the motor is stopped (block 1708). For example, when the covering is fully wound or an obstruction preventing winding is encountered, the motor 150 will be stopped. The method of FIG. 17 then ends until a new instruction is received at the controller.

Figure 18:
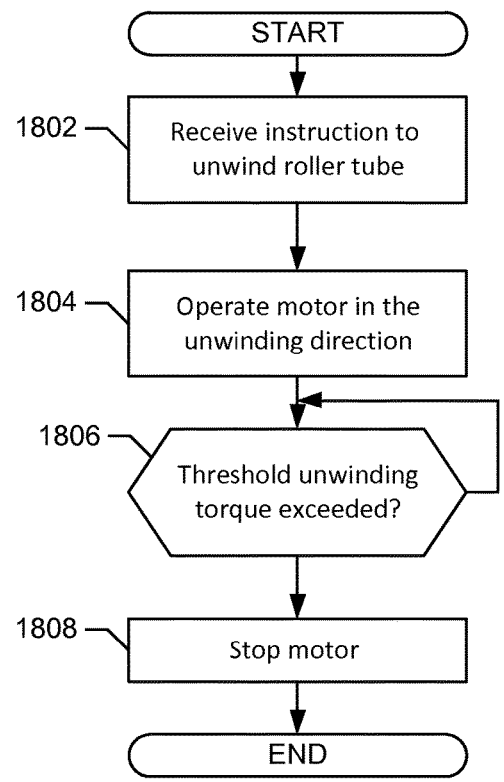

The example method of FIG. 18 begins when the controller receives an instruction to unwind the roller tube 150 (block 1802). In response to the instruction, the controller operates the motor 156 in an unwinding direction (e.g., to lower covering material attached to the roller tube 150) (block 1804). As previously described, the torque limiting motor coupling 88 prevents rotation of the output shaft of the motor 156. Accordingly, the radial body of the motor 156 and the roller tube 150 are rotated. The controller determines if the torque on the motor exceeds an unwinding torque threshold (block 1806). For example, when the covering is unwound to its lower-most limit, the covering material may begin to wind on the roller (e.g., raising the covering material). This winding will increase the torque on the motor (e.g., to levels similar to the levels found when operating the covering in winding). Thus, the threshold can be selected so that normal unwinding does not exceed the torque threshold, but winding the covering material (e.g., after fully unwinding the covering material) will cause the threshold to be passed. According to the illustrated example, the winding threshold exceeds the unwinding threshold so that end-of-material winding can be detected.

If the unwinding torque threshold has not been exceeded (block 1806), the motor 156 continues to operate until the threshold is exceeded. If the unwinding torque threshold has been exceeded (block 1806), the motor is stopped (block 1808). For example, when the covering is fully unwound and starts to wind, the motor 156 will be stopped. The method of FIG. 18 then ends until a new instruction is received at the controller.

Figure 19:
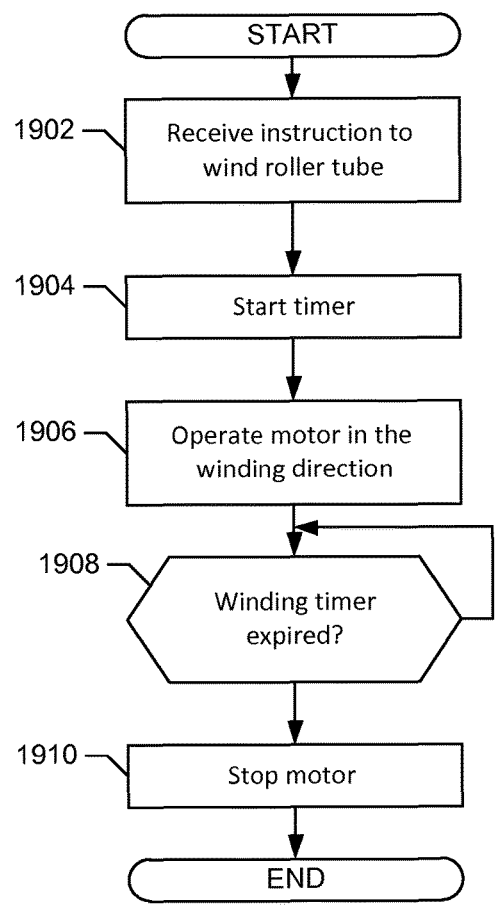

FIG. 19 is a flowchart illustrating an example method to control operation of an architectural opening covering. The example method of FIG. 19 is described in conjunction with the roller tube 150 of FIG. 9. However, the example method may be used with any other covering.

The example method of FIG. 19 begins when a controller receives an instruction to wind the roller tube 150 (block 1902). For example, the controller may receive an instruction from a wireless remote control via a wireless receiver included in the controller, from a wired or wireless remote control, from a button on a control panel, etc. In response to the instruction, the controller starts a timer (block 1904). For example, the timer may be set for a duration that is long enough for a covering on the roller tube 150 to be wound from its lower-most position to its upper-most position. The timer may additionally include an additional time to account for short delays in winding (e.g., a short amount of time during which the covering is obstructed). Then, the controller operates the motor 156 in a winding direction (e.g., to raise covering material attached to the roller tube 150) (block 1906). As previously described, a torque limiting motor control 88 prevents rotation of the drive shaft of the motor 156. Accordingly, the casing of the motor 156 and the roller tube 150 are rotated.

The controller then determines if the winding timer has expired (i.e., the winding time limit has been reached) (block 1908). For example, the covering may have been wound from its lower-most position to its upper-most position. Alternatively, the covering may have been wound from an intermediate position to its upper-most position. In such an operation, the motor 156 would continue to run when the covering reaches its upper most position while the torque limiting motor coupling 88 slipped to prevent excessive torque from being applied to the roller tube 150 until the timer expired. In another instance, the covering may encounter an obstruction that prevents fully winding the covering material. In such an operation, the motor 156 would continue to run while the torque limiting motor coupling 88 slipped to prevent excessive torque from being applied to the roller tube 150 until the timer expired.

If the winding timer has not expired (block 1908), the motor 156 continues to operate until the timer expires. If the winding timer has expired (block 1908), the motor is stopped (block 1910). The method of FIG. 19 then ends until a new instruction is received at the controller.

Figure 20:
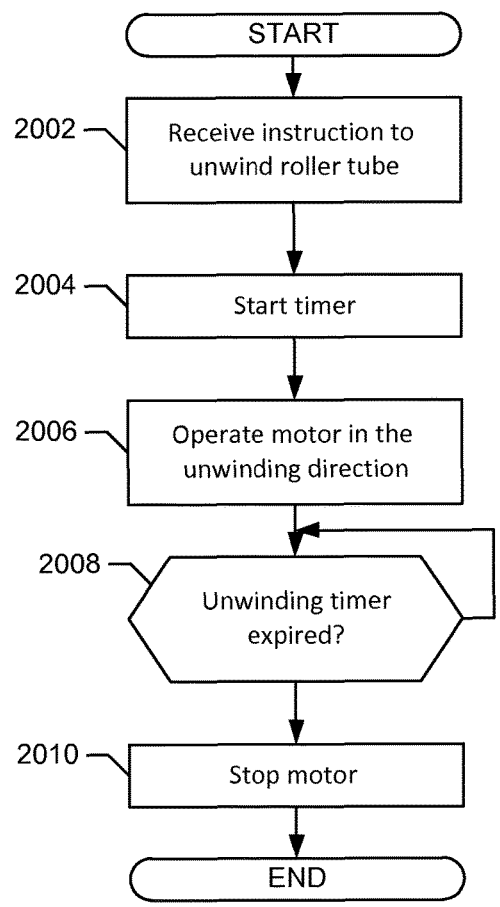

FIG. 20 is a flowchart illustrating an example method to control operation of an architectural opening covering. The example method of FIG. 20 is described in conjunction with the roller tube 150 of FIG. 9. However, the example method may be used with any other covering.

The example method of FIG. 20 begins when a controller receives an instruction to unwind the roller tube 150 (block 2002). For example, the controller may receive an instruction from a wireless remote control via a wireless receiver included in the controller, from a wired or wireless remote control, from a button on a control panel, etc. In response to the instruction, the controller starts a timer (block 2004). For example, the timer may be set for a duration that is long enough for the covering to be unwound from its upper-most position to its lower-most position. The timer may additionally include an additional time to account for short delays in unwinding (e.g., a short amount of time during which the covering is obstructed). Then, the controller operates the motor 1808 in an unwinding direction (e.g., to lower covering material attached to the roller tube 150) (block 2006). As previously described, the torque limiting motor coupling prevents rotation of the drive shaft of the motor 156. Accordingly, the casing of the motor 156 and the roller tube 150 are rotated because the motor 156 no longer opposes unwinding of the covering (e.g., where a weight attached to covering material of the covering creates a torque to pull the covering material).

The controller then determines if the unwinding timer has expired (i.e., the unwinding time limit has been reached) (block 2008). For example, the covering may have been unwound from its upper-most position to its lower-most position. Alternatively, the covering may have been unwound from an intermediate position to its lower-most position. In such an operation, the motor 156 would continue to run when the covering reaches its lower-most position while the torque limiting motor coupling 88 prevented torque from being applied to the roller tube 150 until the timer expired. In another instance, the covering may encounter an obstruction that prevents fully unwinding the covering material. In such an operation, the motor 156 would continue to run while the torque limiting motor coupling 88 slipped to prevent excessive torque from being applied to the roller tube 150 until the timer expired.

If the unwinding timer has not expired (block 2008), the motor 156 continues to operate until the timer expires. If the unwinding timer has expired (block 2008), the motor is stopped (block 2010). The method of FIG. 20 then ends until a new instruction is received at the controller.

Figure 21:
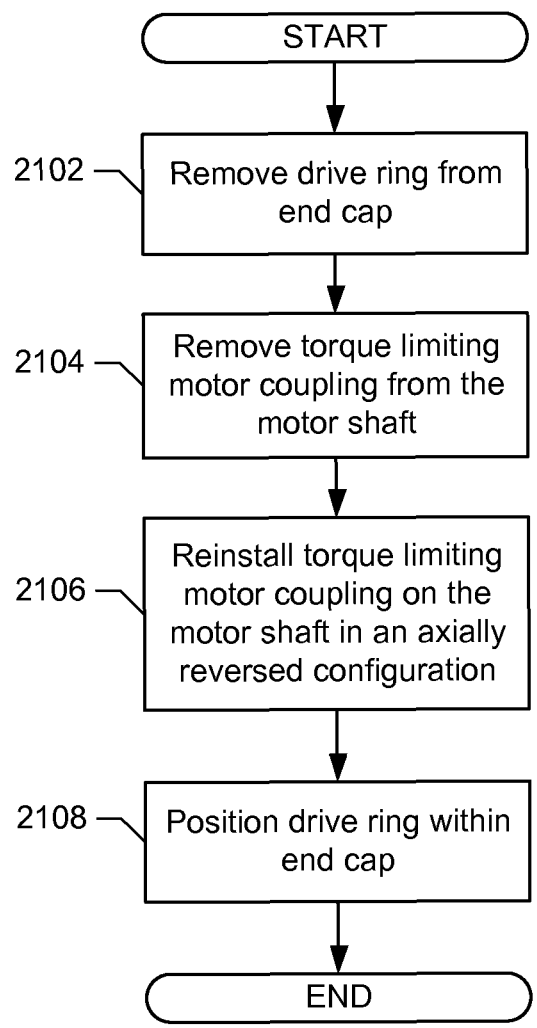
FIG. 21

FIG. 21 is a flowchart illustrating an example method to switch a motor control of an architectural opening covering from a right-handed operation to a left-handed operation (or vice versa). The example method of FIG. 21 is described in conjunction with the roller tube 150 of FIG. 9. However, the example method may be used with any other covering.

The example method of FIG. 21 begins with removing the drive ring 201 from the end cap 164 installed in the roller tube 150 (block 2102). Then, the torque limiting motor coupling 88 is removed from the motor shaft 160 (block 2104). The torque limiting motor coupling 88 is then reinstalled on the motor shaft 160 in an axially reversed configuration (block 2106). In other words, the torque limiting motor coupling 88 is reinstalled so that the direction in which the torque limiting motor coupling 88 prevents the motor 156 from applying torque to the roller tube 150 is reversed. The drive ring 201 is then positioned within the end cap 164 (block 2108). The roller tube 150 is then ready to be installed to operate in opposite direction from its previous operation (e.g., left-handed operation changed to right-handed operation or right-handed operation to left-handed operation). A controller for the motor 150 can be instructed of the change to operate winding and unwinding of the motor 156 in the appropriate directions following the change.

Although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. An architectural opening covering apparatus comprising:
   a rotatable member;
   a covering mounted to the rotatable member;
   a motor having a drive shaft structured to rotate the rotatable member in a first direction to raise the covering;
   a drive shaft coupling structured to substantially prevent the motor from applying torque to the rotatable member in a second direction opposite the first direction such that the covering lowers without the motor driving the rotatable member in the second direction; and
   a controller structured to energize the motor to rotate the rotatable member in the first direction to raise the covering and to energize the motor to allow the rotatable member to rotate in the second direction to lower the covering.

2. The apparatus of claim 1, further including a bottom rail connected to an end of the covering.

3. The apparatus of claim 1, wherein:
   the rotatable member is a roller tube;
   the covering is roller shade fabric; and
   the motor is disposed within the roller tube.

4. The apparatus of claim 3, wherein the drive shaft coupling includes a ratchet and pawl, and an inner surface of the roller tube includes gear teeth.

5. The apparatus of claim 4, wherein the gear teeth are disposed on the roller tube via an additional coupling.

6. The apparatus of claim 3, further including a crown coupling connected to the roller tube and forming a disk with a cutout, the drive shaft coupling including an elongated member positioned within the cutout and having an end connected to the drive shaft.

7. The apparatus of claim 6, further including:
   a sensor positioned to sense when a first surface in the cutout separates from a first surface of the drive shaft coupling while the motor is running; and
   motor control electronics configured to receive a signal from the sensor and to shut-off the motor upon determining that the first surface in the cutout has separated from the first surface of the drive shaft coupling while the motor is running.

8. The apparatus of claim 7, further including an additional sensor in circuit with the motor control electronics, the additional sensor positioned to sense when a second surface in the cutout separates from a second surface of the drive shaft coupling while the motor is running.

9. The apparatus of claim 1, wherein the drive shaft coupling includes a one-way roller bearing structured to impede the motor from applying torque to the rotatable member in the second direction and a crown coupling connecting an outer race of the one-way roller bearing to the rotatable member.

10. The apparatus of claim 1, wherein the drive shaft coupling is structured to impede the motor from applying torque to the rotatable member above a threshold level in the first direction, the threshold level being at or above a level required to raise the covering.

11. The apparatus of claim 1, wherein the drive shaft coupling substantially prevents the motor from applying torque to the rotatable member above a threshold level in the first direction, the threshold level being at or above a level required to raise the covering.

12. The apparatus of claim 11, wherein the drive shaft coupling includes a slip-clutch positioned around an outer race of a bearing, the slip-clutch structured to slip at the threshold level.

13. The apparatus of claim 12, wherein the drive shaft coupling includes a spring positioned about the slip-clutch.

14. The apparatus of claim 13, further including a crown coupling connected to the rotatable member, the crown coupling structured to communicate rotation from the drive shaft coupling to the rotatable member.

15. The apparatus of claim 14, wherein:
the slip-clutch includes a first cavity;
the spring includes a second cavity; and
the crown coupling includes a tang projecting into the first cavity and the second cavity;
the drive shaft coupling structured to communicate motor rotation to the crown coupling unless at least one of:
the slip-clutch slips against the bearing of the drive shaft coupling; or
an outer race of the bearing rolls with respect to the drive shaft.

16. The apparatus of claim 1, excluding a limiter system which requires setting top and bottom winding points.

17. The apparatus of claim 1, further including at least one of a current based overload system or a torque based overload system configured to stop the motor upon sensing strain in a winding direction.

18. The apparatus of claim 1, wherein the motor is powered by a timed pulse of power; and
further including:
an end cap fixedly connecting the motor to a first end of the rotating member, the end cap removably seating the drive shaft coupling against the drive shaft; and
a drive ring removably connected adjacent an architectural opening, a portion of the drive ring to be removably positioned within the end cap between an outer surface of the end cap and a spring of the drive shaft coupling;
the spring includes a cavity;
the portion of the drive ring within the end cap includes a tang projecting into the cavity; and
the drive shaft coupling includes a slip-clutch, the drive shaft coupling structured to communicate motor rotation to the drive ring to rotate the rotating member, unless at least one of:
the slip-clutch slips against a bearing; or
an outer race of the bearing rolls with respect to the drive shaft.

19. The apparatus of claim 18, further including vibration isolators connecting the motor to the end cap.

20. The apparatus of claim 18, further including:
a tube bracket removably connected to a wall bracket at said architectural opening; the drive ring being fixedly connected to the tube bracket.

21. The apparatus of claim 18, further including a slip-ring structured to connect a wire to the motor to power the motor.

22. The apparatus of claim 21, further including a stationary bracket,
the stationary bracket structured to expose first and second contacts, the first and second contacts being electrically insulated from each other and respectively defining a hot contact and a neutral contact;
the slip-ring includes a rotating housing fixedly connected to the rotatable member so as to rotate therewith;
the rotating housing includes first and second conducting members, the first and second conducting members being electrically insulated from each other, the first and second conducing members being respectively wired to a hot contact and a neutral contact on the motor;
wherein, when the apparatus is removably installed in said architectural opening:
the first contact and the first conducting member are removably biased into contact; and
the second contact and the second conducting member are removably biased into contact.

23. The apparatus of claim 1, wherein the drive shaft coupling includes a one-way roller bearing structured to substantially prevent the motor from applying torque to the rotatable member in the second direction.

24. The apparatus of claim 7, wherein the motor is reversible between a right-handed and a left-handed configuration.

25. An architectural opening covering apparatus comprising:
a rotatable driven shaft;
a covering coupled to a lift cord attached to a lift spool mounted to the rotatable driven shaft;
a motor structured to rotate a drive shaft in a first direction to raise the covering by rotating the lift spool;
a controller configured to energize the motor to rotate the rotatable member in the first direction to raise the covering and to energize the motor to allow the rotatable member to rotate in a second direction to lower the covering;
the lift spool structured to rotate in the second direction to lower the covering without the motor applying substantial torque to the lift spool in the second direction; and
a drive shaft coupling structured to substantially prevent the motor from applying torque to the lift spool in the second direction.

26. An architectural opening covering apparatus comprising:
a rotatable member;
a covering mounted to the rotatable member;
a motor having a drive shaft structured to rotate the rotatable member in a first direction to raise the covering and to allow the rotatable member to rotate in a second direction opposite the first direction to lower the covering without the motor applying torque to the rotatable member in the second direction;
a controller configured to energize the motor to rotate the rotatable member in the first direction to raise the covering and to energize the motor to allow the rotatable member to rotate in the second direction to lower the covering; and
a one-way roller bearing structured to impede the motor from applying the torque to the rotatable member in the second direction such that the covering lowers without the motor driving the rotatable member in the second direction when the motor operates in the second direction.

\* \* \* \* \*

UNITED STATES PATENT AND TRADEMARK OFFICE
CERTIFICATE OF CORRECTION

PATENT NO.        : 9,790,739 B2                            Page 1 of 1
APPLICATION NO.   : 13/699580
DATED             : October 17, 2017
INVENTOR(S)       : Wendell Colson and Daniel Fogarty It is certified that error appears in the above-identified patent and that said Letters Patent is hereby corrected as shown below:

In the Claims

Column 20, Line 1:
Replace "conducing" with --conducting--

Signed and Sealed this
Fifteenth Day of May, 2018

Andrei Iancu
*Director of the United States Patent and Trademark Office*